US006324683B1

(12) United States Patent
Fuh et al.

(10) Patent No.: US 6,324,683 B1
(45) Date of Patent: *Nov. 27, 2001

(54) SYSTEM, METHOD AND PROGRAM FOR DEBUGGING EXTERNAL PROGRAMS IN CLIENT/SERVER-BASED RELATIONAL DATABASE MANAGEMENT SYSTEMS

(75) Inventors: You-Chin Gene Fuh, San Jose; Michael Stephen Meier, Newark; Hsin Pan, San Jose, all of CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/606,172

(22) Filed: Feb. 23, 1996

(51) Int. Cl.[7] .................................................. G06F 9/45
(52) U.S. Cl. ................................................................ 717/4
(58) Field of Search .................................. 709/302, 300, 709/303, 328, 310; 395/792, 708; 717/4; 714/38

(56) References Cited

U.S. PATENT DOCUMENTS

| 5,127,013 | 6/1992 | Hill et al. . | |
|---|---|---|---|
| 5,319,645 | 6/1994 | Bassi et al. . | |
| 5,361,352 | 11/1994 | Iwasawa et al. . | |
| 5,371,746 | 12/1994 | Yamashita et al. . | |
| 5,404,523 | 4/1995 | DellaFera et al. . | |
| 5,410,648 | 4/1995 | Pazel . | |
| 5,752,018 | * 5/1998 | Sheffield | 707/2 |
| 5,781,778 | 7/1998 | Meier et al. . | |
| 5,787,245 | * 7/1998 | You et al. | 714/38 |
| 5,794,046 | 8/1998 | Meier et al. . | |
| 5,794,047 | 8/1998 | Meier . | |
| 5,802,371 | 9/1998 | Meier . | |
| 5,815,653 | 9/1998 | You et al. . | |
| 5,850,550 | * 12/1998 | Li et al. | 395/708 |
| 5,862,379 | * 1/1999 | Rubin et al. | 395/702 |

OTHER PUBLICATIONS

Ponamgi, M.K. et al., "Debugging Multithreaded Programs with MPD," IEEE Software, vol. 8, No. 3, May 1991, pp. 37–43.

Timmerman, M. et al., "The Design of D.A.R.T.S.: a Dynamic Debugger for Multiprocessor Real–Time Applications," IEEE Transactions on Nuclear Science, vol. 39, No. 2, Apr. 1992, pp. 121–129.

(List continued on next page.)

Primary Examiner—Majid Banankhah
Assistant Examiner—Sue Lao
(74) Attorney, Agent, or Firm—Gates & Cooper LLP

(57) ABSTRACT

The present invention provides a method, system, and program for debugging external programs, such as user-defined functions, stored procedures, and triggers executed in relational database management systems (RDBMS), in a client-server, i.e., distributed, environment. In the present invention, a debugger is initiated from within a process running the external program by executing a special segment of code prior to the execution of the external program. In one embodiment of the invention, this debugging function is triggered by including a variation of this special segment of program code within the external program, itself. In another embodiment of the invention, this debugging triggering function is provided within an enhanced RDBMS with extensions to SQL to activate the debugging ability in the RDBMS. The invention can be implemented by using present day serial debuggers or parallel and/or distributed debuggers. One such parallel and distributed debugger utilized in a preferred embodiment is the Parallel and Distributed Dynamic Analyzer (PDDA) debugger. In addition, although the following invention is described with reference to a debugger, the invention can be applicable for any application development tool.

19 Claims, 16 Drawing Sheets

OTHER PUBLICATIONS

Borchert, C.B., "Organization and Management of Ditributed Execution Event Histories for Real–Time Debugging," Southeastcon, 1992 IEEE Conference Proceedings, 1992, pp. 343–345.

Tsai, J.J.P. et al., "A Noninvasive Architecture to Monitor Real–Time Distributed Systems," Computer Magazine, vol. 23, No. 3, Mar. 1990, pp. 11–23.

Matabe, Y. et al., "Debugging Dynamic Distributed Programs Using Global Predicates," Parallel and Distributed Processing, 1992 Symposium (4th), 1992, pp. 402–407.

Tsai, J.J.P et al., "On Real–Time Software Testing and Debugging," Computer Software and Applications Conference, 1990 COMPSAC, 1990 (7 pages).

Shimomura, T. et al., "CHASE: A Bug–Locating Assistant System," Computer Software and Applications Conference—1991 COMPSAC, 1991, pp. 412–417.

Moher, T.G., "PROVIDE: A Process Visualization and Debugging Environment," IEEE Transactions on Software Engineering, vol. 14, No. 6, Jun. 1988, pp. 849–857.

Arvind, D.K. et al., "Debugging Concurrent Programs Using Static Analysis and Run–Time Hardware Monitoring," Parallel and Distributed Processing, 1991 Proceedings, 1991, pp. 716–719.

* cited by examiner

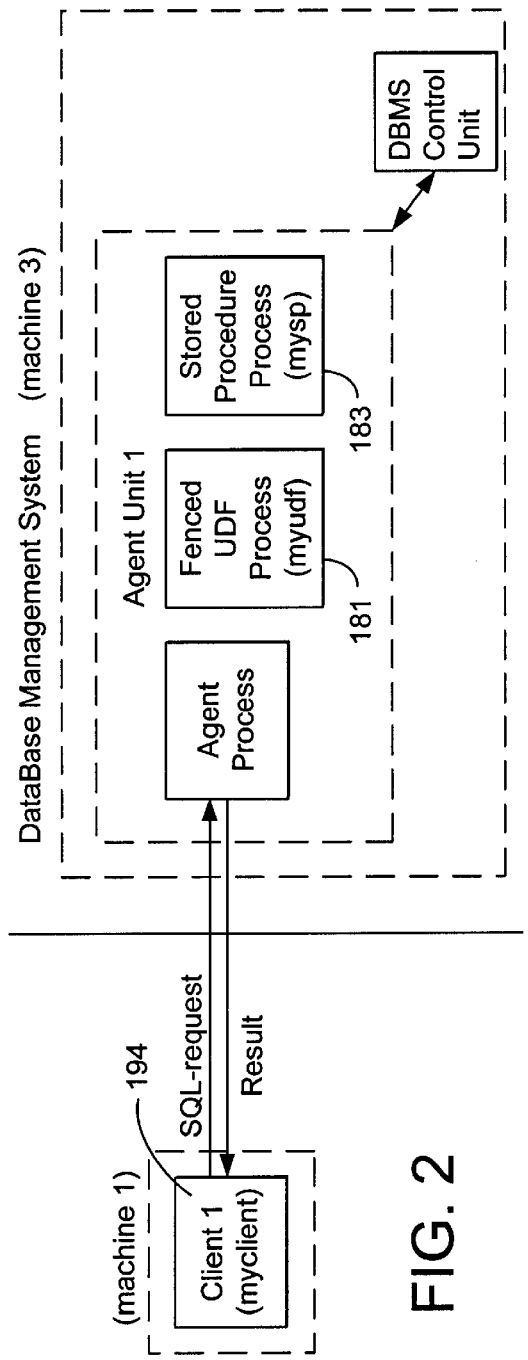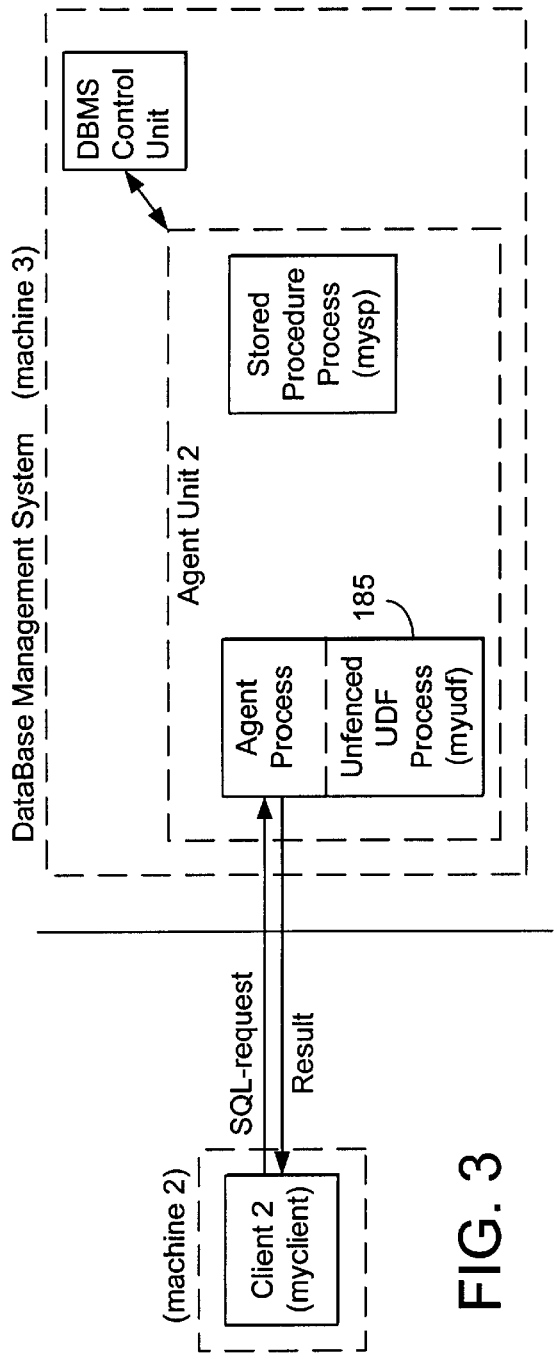

```
include<pthread.h>            /* Standard POSIX Thread definition */ typedef struct {
    unsigned char type;  /* 0=Internet Protocol, 1=SNA 2=NETBIOS ... */
    char *hostaddr;
} HOSTID;

typedef unsigned int ASID;  /*Address Space ID */ typedef pthread_t THREADID; /* Use POSIX thread for our thread ID */ typedef struct invstkframerec {
    unsigned char type;   /* 0=client 1=fenced UDF 2=un-fenced UDF 3=stored procedure */
    HOSTID host;          /* host ID where program is running */
    ASID addrspace;       /* address space ID where program is running */
    THREADID thread;      /* thread ID where program is running */
    char *userid;         /* user ID that the program is running under */
    char *sql_stmt;       /* current SQL statement */
    int startexp;         /* start of current expression in SQL statement */
    int endexp;           /* end of current expression in SQL statement */
    char *name;           /* external program name or null if type=client program */
    ADDRESS ep;           /* entry point of external program or null if type=client program */
} INVSTKFRAME;
```

SYSTEM, METHOD AND PROGRAM FOR DEBUGGING EXTERNAL PROGRAMS IN CLIENT/SERVER-BASED RELATIONAL DATABASE MANAGEMENT SYSTEMS

CROSS REFERENCE TO RELATED APPLICATION

This application is related by common inventorship and subject matter to copending patent application Ser. No. 08/606,166 entitled "DYNAMIC CONNECTION TO A REMOTE TOOL IN A DISTRIBUTED PROCESSING ENVIRONMENT" filed on Feb. 23.1996, assigned to the Assignee hereof and entirely incorporated herein by this reference.

This application is related by common inventorship and subject matter to copending patent application Ser. No. 08/314,838 entitled "METHOD AND SYSTEM FOR DEBUGGING PARALLEL AND DISTRIBUTED APPLICATIONS" filed on Sep. 29, 1994, now U.S. Pat. No. 5,802,271, assigned to the Assignee hereof and entirely incorporated herein by this reference.

This application is related by common inventorship and subject matter to copending patent application Ser. No. 08/314,839 entitled "METHOD OF WAKING-UP A CALL STACK FOR A CLIENT/SERVER PROGRAM THAT USES REMOTE PROCEDURE CALL" filed on Sep. 29, 1994, now U.S. Pat. No. 5,794,046 assigned to the Assignee hereof and entirely incorporated herein by this reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates to systems, methods, and programs for utilizing application development tools, and more specifically, for utilizing a debugger to debug external programs such as stored procedures and user-defined functions that are used in database processing systems.

2. Description of the Related Art

A distributed processing environment includes two or more processing nodes connected by a communications link, i.e., a network. At each processing node, there may be at least one processor, and any assortment of memory devices, storage devices, and input/output devices such as keyboards, displays, etc. The advantages of a distributed processing system include being able to utilize the resources (e.g., files, applications, tools, storage, etc.) resident at another node in the network. However, technical difficulties arise in trying to utilize and take advantage of these resources in a distributed environment. More specifically, technical difficulties arise when parts of an application program execute on different machines, especially when one desires to debug such an application program. Difficulties also arise when a debugger may reside on a different machine than the program to be debugged or may reside anywhere within a network of machines.

When developing a user's program that may be running in a distributed environment and is embedded within a larger application not written by the user, it is often difficult to debug the user's program. For example, for a CICS transaction, a DB/2 stored procedure, trigger, user-defined functions, and code utilizing object-oriented frameworks, the developer of the larger program, in many cases, will only provide an application program interface (API) and a specification of its behavior. Source code for the larger program or information on its implementation is often not provided to allow its developer greater flexibility in making changes such as enhancements and bug fixes. In addition, for distributed client/server applications such as a CICS transaction, DB2 stored procedure, or DSOM server, the application programs are executed under the control of a software system such as the CICS transactions manager, DB2 database management system, or DSOM runtime environment. As such, the software system and various parts of an application program may be executing on different machines. This makes it difficult to run the application program under a debugger because it is not easy to determine when the application program will be invoked by the software system and, in some cases what process and/or machine it will run in. In addition, it is difficult, if not impossible, for a debugger to penetrate all the layers of code in the large software systems in order to find the smaller programs (e.g., stored procedures, user-defined functions, CICS transaction) to debug.

CICS (Customer Information Control System) is a transaction monitoring system which provides a high level of efficiency for executing, including executing concurrently, thousands of multiple short running application programs, i.e., transaction programs. For example, many financial transactions, e.g., debiting accounts, crediting accounts, transfers, etc., may run under a transaction monitor. Transaction monitors that run on workstation platforms such as the UNIX operating system and OS/2 operating system have similarities in their architecture. Such transaction monitors include CICS/6000, Tuxedo, and Encina, to name a few.

The technology of running external programs on the server side of a Relational Database Management System (RDBMS) has been developed in the past few years. For example, DB2/Common-Server for AIX/6000 (DB2/CS) supports external programs. External programs are written by the application developer in a host 3GL language such as C and C++. They could be invoked by the RDBMS in one of two forms: (1) as a subprogram running inside of the server's "address space" (also referred to as "process"), or (2) as a stand-alone application running on the server machine. The former is usually referred to as User-Defined Functions (UDF), and the latter is referred to as Stored Procedures.

A stored procedure allows the application developer to break a database application program into a client part and a server part. A stored procedure is a precompiled program that is stored at the server site and invoked from the client. The server part can issue SQL language request while running on the same machine as the RDBMS server, such as a DB2/CS server. Results from the execution of the stored procedure can be passed back to the client part which is usually running on a different machine. In many applications, this can greatly improve the performance of the database application. Stored procedures reduce the network traffic between the client and the server. Other advantages include concealing a variety of system-specific and/or database-specific details from the user, thereby providing a greater degree of data independence; sharing a stored procedure by many clients; and providing enhanced security by authorizing a given user to invoke a given procedure but not to operate directly on the data accessed by that procedure.

In addition, the following described invention is also applicable to triggers. A trigger allows a user to associate certain SQL operations with a certain event. A trigger is a procedure that is to be invoked, by the database management system, when a specific condition occurs. For example, a trigger could be invoked to check the range value of employees' salaries whenever an SQL update is made to an employee/salary table to ensure that no salary goes above a certain amount. More specifically, an external trigger is a trigger than runs externally from the system software, i.e., a DBMS.

UDF (User-Defined Function) is, as its name implies, a function that takes in input and returns single value results. As a function, it must be embedded in an SQL expression. UDF is an innovative feature introduced in release 2 of the IBM DB2/6000 relational database system. In addition, the new SQL3 standard provides a definition for user-defined functions. A user-defined function extends the functionality of the underlying DBMS (Data Base Management System) by allowing users to define their own functions implemented in host languages such as C and C++. Once created in the DBMS, UDFs can be invoked from any context where a SQL expression is expected or invoked from within any SQL expression as if they were built-in functions.

In a practical implementation, UDF could be run under two kinds of environment. For better security, a "firewall" is created between the database engine run-time and the UDF run-time. This is normally achieved by running UDF code in a separate process which is different from the engine process. Such a UDF is called a fenced UDF. In contrast, for better performance, UDF code is run in the same process as that of the database engine. Such a UDF is called an un-fenced UDF.

There are two components associated with a UDF: the specification component and the realization component. The former is specified by the create function SQL statement and maintained by the DBMS. The latter is specified by code written in a host language, prepared using the host language compiler and linkage editor, and maintained by the operating system. Different UDFs can share the same implementation. In other words, one realization component can be associated with more than one specification component. One situation where this can occur is when two UDFs have the same functionality but different runtime environments: one runs in a fenced mode, and the other runs in an unfenced mode.

The first step of creating a UDF, i.e., the specification component, is to register its name and attributes by executing a create function SQL statement. Taking find_string as an example shown below, the specification component is expressed by the following create function statement which specifies that UDF find_string:

takes a LONG VARCHAR argument and a VARCHAR (128) argument as inputs, returns an INTEGER as output, is implemented by an external C function with the same name which is contained in the library udf_string in the path /afs/almaden.ibm.com/u/fuh/udf/lib.

is prepared to run in an unfenced environment, and has various other attributes which are of no interest in this discussion.

For example, the following statement registers a new function find_string with the DBMS:

```
CREATE FUNCTION find_string(LONG VARCHAR, VARCHAR(128))
RETURNS INTEGER
LANGUAGE C
EXTERNAL NAME
'/afs/almaden.ibm.com/u/fuh/udf/lib/udf_string!find_string'
NOT FENCED
NOT VARIANT
NO EXTERNAL ACTION
PARAMETER STYLE DB2SQL
NOT NULL CALL
NO SQL;
```

The first two lines define the interface between the UDF find_string and the context in which it is invoked. The following two lines indicate that find_string is implemented by the C function find_string of the library udf_string located in the path /afs/almaden.ibm.com/u/fuh/udf/lib. The rest of the statement is of no interest in this discussion.

The realization component is prepared by compiling and linking the UDF library with appropriate options. The following command lines show a typical way of preparing UDF libraries. udf_string.c is the source file containing the external function find_string, and udf_string.exp is the export file exporting the symbol find_string.

cc -c -o udf_string.o udf_string.c ld -o udf_string -bE:udf_string.exp -H512 udf_string.o As such, the second step is to build a C library, udf_string, which contains external function find_string:

```
void find_string
  (char *text    /*The text in which sub_string is searched*/
   char *sub_string,/*The sub-string */
   long *position, /*Position in text where sub_string is found*/
   short *null_ind_i1, /*First input null-indicator */
   short *null_ind_i2, /*Second input null-indicator */
   short *null_ind_r, /*Result null-indicator */
   char sqlstate,   /*Error code issued by UDF */
   char *udf_func_name, /* UDF function name */
   char *udf_spec_name, /* UDF specific name */
   char *msg_text)   /* Msg. text returned by UDF */
{
   char *start, *cptr1, *cptr2;
   int start_position;
   /* Initialization */
   start = text;
   start_position = 1 ;
   /* Set up new string for comparison */
try_again:
      *position = start_position++;
      cptr1 = start++;
      cptr2 = sub_string;
      /* Compare sub_string with the new string */
      /* NOTE: the first two if-branches should be swapped */
compare:
      if (*cptr1 == '\0') {
         /* End of text reached; not found */
         *position = 0;
         return;
      }
      else if (*cptr2 == '\0') {
         /* End of sub_string reached; found */
         return;
      }
      else if (*cptr1 == *cptr2) (
         /* So far so good; continue comparing */
         cptr1++;
         cptr2++;
         goto compare;
```

```
    (
    /* Comparison fails; try next string */
    goto try_again;
    }
```

The purpose of find_string is to return the position in text of the first occurrence of sub_string. If sub_string does not occur in text, the return value is 0. At run-time the DBMS prepares and passes actual arguments to external C function find_string via its first two parameters, text and sub_string. The return value is passed back to the DBMS via the third parameter, position, and the sixth parameter null_ind_r which indicates when the result is null. The other parameters of find_string are unrelated to this discussion.

With both the specification component and realization component, the DBMS is equipped with all the information needed to execute UDF find_string as if it were a built-in function. Once the C library is installed in directory /afs/almaden.ibm.com/u/fuh/udf/lib, UDF find_string can be invoked from within any SQL expression. The usage of UDF is demonstrated in the SQL statement below. Let test_table be a table which contains a column text of type LONG VARCHAR. The following query can now be issued to extract all the rows of test_table where the text column contains the substring "User-Defined Function":

SELECT*FROM test_table WHERE find_string(text, 'User-Defined Function') <>0

Without UDF, an SQL statement is intrinsic in the sense that its semantics are predefined by the underlying DBMS. In other words, given a reliable implementation of the DBMS, one can assume that the result returned by the DBMS always respects the intent specified in the SQL statement. If find_string were a pre-defined function, one would expect that the above statement computes the set of rows of test_table where the text column contains the substring "User-Defined Function". However, such an assumption does not necessarily hold in the presence of UDF. In fact, the C code given above contains a couple of defects: first, the null result indicator is not initialized, which may cause the function to appear to return NULL; second, it does not catch the situation where the substring "User-Defined Function" ends the text. As a consequence, rows with the following text content will be excluded from the result:

'. . . can be achieved by using User-Defined Function'

Despite the simplicity of the C function find_string, it may still take a while to figure out that the defect is caused by misplacing the "end-of-string" checking for text before that of sub_string. In general a UDF can use any feature of the host language and be arbitrarily complex; hence, UDF debugging becomes an important issue.

The flexibility offered by UDFs comes with the responsibility to ensure correctness. If the UDF logic contains an error, incorrect results or failure of the SQL expression may occur. In a client-server environment such as IBM DB2/6000, none of the conventional debugging methodologies works for a UDF.

The ability to easily debug a UDF running online, that is in the environment of the DBMS, is a desirable feature, especially in the support of the development of UDF. Online debugging support complements the stand-alone development and testing of UDF code by exposing behavior unique to the UDF runtime environment and making it convenient to reproduce the situation causing the failure, compared to developing a stand-alone driver and equivalent data set.

The following describes a UDF run-time environment, as well as the difficulty with debugging UDF code in the online DBMS. FIG. 1 characterizes a RDBMS run-time environment in which the technology of user-defined functions, stored procedures and triggers are applicable. On the server side 191, there is a set of control processes, represented by the DBMS Control Unit box 193, created at database instance creation time. The control unit listens to the client side 192 to receive the next "connection" request. For each connection request, the control unit spawns a new set of processes which is referred to as an agent unit 195, 197. Therefore, each client connecting to the DBMS has a set of processes (agent unit) associated with it. The newly created agent unit 195 is connected to the corresponding client 194 for receiving and serving the subsequent database requests. Among these processes, (agent unit), there is a distinguished one called agent process which repeatedly takes a request from client, serves the request, and returns the result, if there is any, back to the client. As such, the agent unit consists of an agent process 199 and, optionally, a set of fenced UDF processes 181 and/or a set of stored procedure processes 183.

The agent process 199 runs the major part of the database engine code and is therefore also referred to herein as the "database engine." The agent process takes the request from the client and distributes the request to various service components of the database engine to accomplish the requested action. Typical service components of a RDBMS include a front-end router, a query compiler, catalog service, data management, buffer management, security management, concurrency-control, interpreter and run-time service, etc. Besides the database engine code, the agent process also runs un-fenced UDF code 185 and the run-time code that supports the un-fenced UDF.

A fenced UDF process runs the run-time code which communicates with agent process, dynamically loads UDF library, and runs fenced UDF code. The number of fenced UDF processes varies from one implementation to another. For example, there could be one fenced UDF process shared by all the fenced UDFs invoked in the current application or there could be more than one such processes, each serves a set of fenced UDFs that are run under the same user ID. The technology presented in this invention is not dependent on the number of fenced UDF processes.

In many aspects, a stored procedure process has the same run-time characteristics as that of a fenced UDF process. Unlike a fenced UDF process, a stored procedure process runs the external program as if it were a stand alone application sitting on the server machine. In general, there could be more than one stored procedure processes associated with a client program.

FIG. 2 shows an example of a client program 194 named myclient that executes a stored procedure 183 named mysp. The stored procedure then executes a SQL SELECT command that contains a call to a fenced UDF myudf.

FIG. 3 shows the same example as FIG. 2 except that the fenced UDF named myudf has been changed to an un-fenced UDF 185. In this case the un-fenced UDF is run in the agent process.

Referring back to FIG. 1, to create a UDF, the client sends a create function statement as a request to agent process. In response to this request, agent process analyzes the statement and registers all the attributes of the UDF being defined by the statement in the DBMS. To use an already registered UDF, the client requests the agent process to execute a DML statement with a UDF invocation in it. In response, the agent process interprets the statement and returns the result to the client. As part of the interpretation, the agent process invokes the top-level run-time support routine for the evaluation of the UDF. The following activities are performed by UDF run-time support routines:

- Agent process initializes UDF process in which the target UDF will run. UDF process could be either agent process itself (for unfenced UDF) or a new process spawned by agent process (for fenced UDF). In both cases, UDF process runs as a daemon process. This is a one-time initialization meaning it takes place only for the first time UDF is invoked.
- Agent process prepares arguments in the format which is ready to be passed to the external function.
- If the associated external function is not resident in memory, UDF process loads the appropriate library into its address space. Such a library will be unloaded at the end of the current transaction.
- UDF process resolves the entry point for the desired external function.
- Agent process requests UDF process to execute the external function.
- Agent process extracts the function result and converts it to DBMS's internal format.

Three characteristics of the run-time environment are of special interest. First of all, UDF code runs at the server site as opposed to within the application's process space. Therefore, ordinary program debugging methodology won't work for UDF. Secondly, UDF process may not exist until the first UDF is invoked and it is difficult to predict when the UDF library is loaded into memory. As a consequence, the debugging methodology based on process attachment does not work for UDF either, as process id and debugging information of UDF library cannot be known in advance. It might seem that this problem can be solved, by having the system post the process id in a file where the debugger can access it. Unfortunately, for security purposes, UDF process normally runs under a designated UID unrelated to a client's UID. This makes the UDF process unattachable from local applications, not to mention applications running as remote clients. The reloading of UDF libraries is one example of a factor of the runtime environment that could potentially confuse the user. The user may wonder when his code is being refreshed, why static variables are being reinitialized, etc. As such it illustrates the utility of a debugging methodology which can lend insight into the UDF runtime environment. The last characteristic of the UDF runtime environment is that it runs as a daemon process with the standard I/O file handles disabled. Therefore, run-time status of UDFs can not be made observable by inserting printf statements. All of these characteristics make UDF debugging very difficult using existing debugging methodologies. This could affect the productivity of application development using UDF and hence discourage users from using UDF.

As such, there are three obstacles to debugging UDF code using a conventional symbolic debugger. These obstacles are especially apparent when a debugger is expected to be initiated from the application's site.

Timing

A UDF process is created on the demand and the external library is loaded/unloaded dynamically. Unloading occurs at the end of a transaction, such as when a COMMIT is performed. There is no convenient way to inform users when UDF code is available for debugging.

Authorization

For security purposes, the DBMS process usually runs under a special UID so that normal users cannot attach to it.

Remote debugging

In general, a remote user does not have a user account on the server machine. This makes it extremely difficult, if not impossible, to debug UDF process on the server machine.

As shown above, external programs are not statically linked with any executable module. Instead, they are dynamically loaded by the database engine when the associated UDF, stored procedure, or trigger is invoked. This makes it extremely difficult to debug external programs running in a client-server environment. This run-time environment has no practical debugging method. The current practice is to write a test driver program which simulates the RDBMS call to the external program.

The main problem with debugging external programs is that the external programs are executed under the control of the database engine which is itself a large software system for which no source code is provided. It is therefore impractical for a debugger to penetrate through the layers of software of the database engine to locate and debug the external programs. It is also very difficult for the debugger to determine when an external program will be invoked by the database engine and which process it will be run in. External programs are not statically linked with any executable module. Instead, they are dynamically loaded by the database engine at run-time when the associated UDF or stored procedure is about to be invoked which further complicates the situation for the debugger. In addition, in an environment where the DBMS is shared between a large number of users, it is necessary to ensure that the debugger does not violate the security of the DBMS or the underlying operating system.

Debugging multi-threaded applications in a distributed environment is known. One approach is to attach a debugger to the main software system and attempt to penetrate all of the software layers to get to the desired part of the program to be debugged. Another approach will stop execution in all of the threads and processes in order to debug an application running in one of the threads. Stopping the execution of processes in a single user environment may be acceptable, but such an approach is unacceptable in multi-user environments or where hundreds of processes may be running as in a CICS transaction monitoring system.

The Parallel and Distributed Dynamic Analyzer (PDDA) is a parallel and distributed debugger that can debug parallel and distributed applications including distributed middleware (e.g., CICS/6000, DCE and DSOM) and DB2/6000 application programs that use RPC and threads (see the PDDA manual).

It is also known to have "application program initiating" debugging wherein an application program, itself, requests the services of a serial debugger when the debugger and application are running on the same machine.

However, it is not known to have an application program, itself, initiate debugging in a distributed environment where the debugger may be running on a different machine, or on several machines, different from the machine the application program is running on. Furthermore, it is not known to have "program-initiating" debugging for RDBMs external programs or transaction programs in a distributed environment. In a distributed environment, a problem arises in not being able to locate the machine or process within the machine that a desired debugger is running on. This difficulty is similar for locating any application development tool desired by an application running in a distributed processing environment.

SUMMARY OF THE INVENTION

An object of this invention is to provide a debugging method for external programs running under a client-server based RDBMS.

It is a further object of this invention to initiate debugging within the external program itself.

It is another object of this invention to integrate debug support within a DBMS to provide richer functionality.

It is a further object of this invention to overcome the obstacles of timing, authorization, and remote debugging when debugging UDF code.

It is a further object of this invention to provide debug support for external programs in connection with parallel and/or distributed debuggers.

The present invention provides a method, system, and program for debugging external programs such as user-defined functions, stored procedures, and triggers in a client-server, i.e., distributed, environment. In the present invention, a debugger is initiated from within a process running the external program by executing a special segment of code prior to the execution of the external program. This special segment of program code includes a "debug" command which specifies a debugger to be invoked, identifies the process being debugged, specifies the directory of the source file of the external program being debugged, informs the debugger to break at the specified function, and can redirect the debugger's input/output to a machine specified.

In one embodiment of the invention, this debugging function is triggered by including a variation of this special segment of program code within the external program, itself. Additionally, a "debug" macro is provided for application programmers to use when writing external programs to specify the debugging information, to register the debugging session with the database management system (DBMS), and to bring up (i.e., trigger) the debugger. The debugger specified will then be brought up and break at the "debug" line that has been included within the external program.

In another embodiment of the invention, this debugging triggering function is provided within an enhanced DBMS. A new SQL construct allows users to specify a debugging intent on a per-application basis. Therefore, different applications invoking the same external function can independently choose whether to debug the function. This "debug" function SQL statement is similar to the "debug" macro in that it specifies a user's intent in debugging selected external programs. An application will send a first SQL command to the DBMS to specify the debug control parameters such as the debugger that the application is running under and the location of source code of the external program to be debugged, and then the application will send a second SQL command that specifies the external program that is to be run in debugging mode. Authorization control over the debugging requests from the applications is provided by the authority checking function of the DBMS which it uses in controlling other database operations.

More specifically, in a distributed environment, the system and method of the invention involves the following. The DBMS maintains a stack of record structures (invocation stack frames) where each record represents an invocation of an application program or an external program. The most recently invoked program is represented by the record at the top of the stack. The DBMS will then receive from an application the new SQL constructs that provide debugging control information and request an external program to be debugged. A library routine is then called to request that a debugger be attached to an external program process. (This feature can be implemented using the invention described in Ser. No. 08/606,166 titled "Dynamic Connection to a Debugger in a Distributed Processing Environment" filed on even date herewith. This enables the same debugger that is attached to the application to be dynamically attached to the external program so that both can be debugged under the same debugger and under the same displayed interface to a user.) Execution of the external program is suspended while the debugger executes a remote procedure call (RPC) to get the most recent invocation stack frame record from the DBMS. The debugger then sets a breakpoint at the entry point of the external program. When the external program is executed, the breakpoint set by the debugger is encountered. The debugger then issues a series of RPC calls to obtain a current context of the underlying external program and displays the current context state along with a frozen external program state to a user. The user can then use all of the debugging functions of the debugger on the external program.

Various embodiments of the invention can be implemented by using present day serial debuggers or parallel and/or distributed debuggers. One such parallel and distributed debugger utilized in a preferred embodiment is the Parallel and Distributed Dynamic Analyzer (PDDA) debugger.

In addition, although the following invention is described with reference to a debugger, the invention can be applicable for any application development tool.

BRIEF DESCRIPTION OF THE DRAWING

For a more complete understanding of this invention, reference is now made to the following detailed description of the embodiments as illustrated in the accompanying drawing, wherein:

FIG. 2 shows an example of a client program that executes a stored procedure;

FIG. 3 shows the same example as FIG. 2 except that the fenced UDF has been changed to an un-fenced UDF 115 running in the agent process;

FIG. 8 illustrates the C language type declaration for the INVSTKFRAME record;

DETAILED DESCRIPTION OF THE PREFERRED EMBODIMENTS

Figure 1:
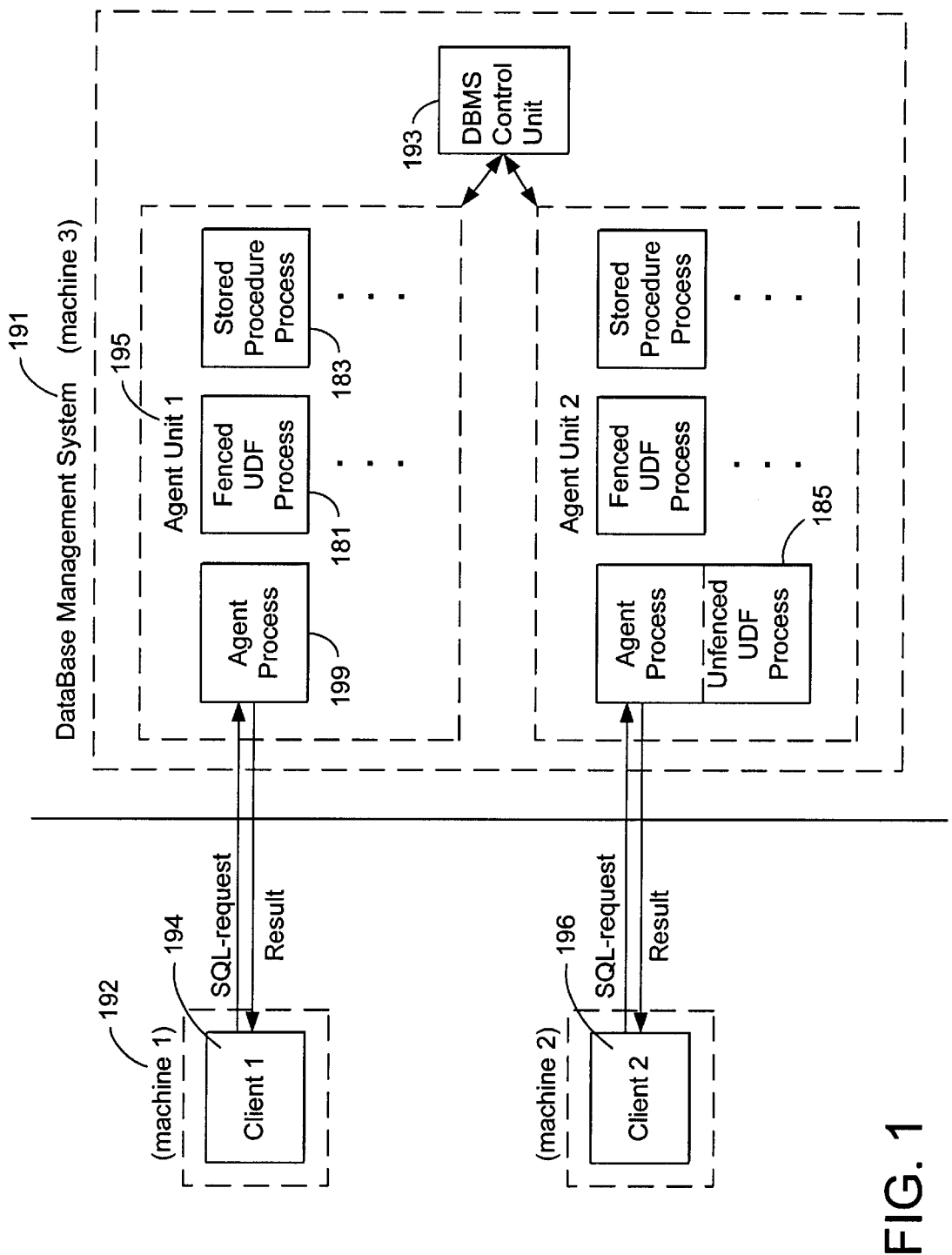
FIG. 1 illustrates a RDBMS "agent=process" run-time environment in which the present invention can be applied.

For purposes of the following description, the following definitions will be used. A software system is a database management system, or a transaction monitoring system, or a message queuing system (e.g., work flow systems), or similar system which provides processing services to client programs. A software system can also be defined as middleware which is defined as software functions that reside between the operating system and applications. A client program or client application will refer to an application program that invokes the software system to request the services of the software system. The client program may either be a previously created program or one entered interactively by a user using an interactive SQL interface. The client program will typically run on a client machine separate from the machine running the software system, but they could be on the same machine. An external program is a program written in a host language other than the SQL language, itself. External programs include stored procedures, triggers, user-defined functions or other user code that is invoked by, and under the control of, the software system, e.g., the database management system, but is external to, and not a part of, the software system, and is a separate executable from the client program. A transaction program is invoked by, and under the control of, a transaction monitoring system but is external to, and not a part of the software system, and is a separate executable from the client program. An application program or user program is an external program or a transaction program or client program or other user code.

The preferred embodiment of the following described invention can be implemented most readily on systems having certain architectural elements as can be found in the UNIX, and Windows NT operating systems; more specifically in conjunction with database management systems (e.g. IBM DB2/Common-Server on Risc System/6000). Such architectural elements include debugging support in the operating system that allows a debugger to attach to a running process and an RDBMS that is implemented using an "agent=process" model (i.e., each connected client is serviced by a database engine that is running in a set of processes on the database server machine that is not shared by other clients). However, the invention may also be applicable, perhaps with some modification within the spirit and scope of the invention, to other operating systems and DBMS. For example, in the case of a DBMS that is implemented using an "agent=thread" architectural model (i.e., each connected client is serviced by a database engine that is running in a set of threads on the database server machine within a process that is shared by other clients) as in the DB2/Common-Server for OS/2. Such an implementation may have to be modified such that there is only one user, or the debugging support in the operating system is enhanced to be able to debug an individual thread in a process while the other threads continue to execute. Otherwise, without such a modification, a debugging session would lock-out, i.e., stop, other user's threads in the multi-user system, which may be an undesirable result if there is more than one user. Furthermore, this invention is applicable in conjunction with other database management systems, transaction monitors, message queuing systems, or other software systems or other client/server applications.

The present invention involves having the UDF process, stored procedure, trigger, or any other external program initiate the debugger. The three obstacles, timing, authorization, and remote debugging, are essentially eliminated with this approach. With respect to timing, if the UDF process can initiate the debugger right before the external function is invoked, this problem is automatically solved. With respect to authorization, the lack of permission to attach UDF process occurs because it is expected that the debugger be initiated by the client. This problem is overcome by granting the debugger such permission since the debugger is initiated from UDF process itself. Likewise, with respect to remote debugging, remote users cannot access the machine where a UDF process runs because it is expected that the debugger be initiated by the client. This problem is overcome by redirecting a debugger's standard I/O to the remote machine if the debugger is initiated by a UDF process. X-windows is sufficient to support communication between the debugger and the user. Running on the server, an X-windows based debugger or a command-line style debugger in an xterm window can specify the user's display as the X-window server, enabling the UDF to be debugged remotely.

Therefore, all these issues now reduce to the problem of how to initiate a debugger from a UDF process for debugging UDF code running in its own address space. There are two approaches to achieving this: DBMS-initiating approach and externally-initiating approach. In both approaches, the DBMS-initiating approach and the externally-initiating approach, the UDF of interest can be debugged in the usual way.

The basic idea of both approaches is illustrated with a segment of C code which is executed right before the execution of UDF code. Without loss of generality, the following example assumes the underlying symbolic debugger is "xldb", an IBM source debugger for C, C++, and Fortran 90.

In the DBMS-initiating approach, the debugger is "triggered" from within the DBMS. The following segment of program illustrates the basic mechanism:

```
{
    char debug_cmd[256] ;
    sprintf (debug_cmd, "xldb -a %d -I %s -r %s -display %s %s &",
        getpid(), source_path, function_name, display,
        program_name) ;
    system(debug_cmd) ;
    sleep(5) ;
}
```

The first statement prepares a shell command for invoking the "xldb" debugger. The "-a" option specifies the process id of the process being debugged. The "-I" option specifies the directory where the source file is located. The "-r" option tells the debugger to break at the specified function. The "-display" option redirects the window display and maps the keyboard and mouse devices to those of the machine specified by the argument. For a local client, this argument can be ignored. For a remote client, this argument must be set to the IP address of the remote machine. The last argument on the "xldb" command line is the name of the program to be debugged.

Notice that this command is run as a background job so that the parent process does not have to wait for its completion. Therefore, execution of the second statement spawns a new process running the prepared command and returns to the calling process immediately.

The last statement keeps the running process idle for a period of time so that the debugger can attach to it before the calling process proceeds to execute the external function.

As the result of executing this segment of code in UDF process, a new "xldb" process will be brought up and the execution will break at the first executable statement of the external function being debugged.

In the externally-initiating approach, the debugger is "triggered" from within the external function itself. The basic mechanism is illustrated by a variation of the C program given above:

```
{
    char debug_cmd [256] ;
    sprintf (debug_cmd, "xldb -a %d -I %s -display %s %s &",
        getpid(), source_path, display, program_name);
    system (debug_cmd) ;
    sleep(5) ;
}
```

Since the "trigger" code is part of the external function, there is no need to specify the "-r" option. The debugger will be brought up and very likely break at the "sleep" statement.

An implementation of the externally-initiating approach using both "xldb" and "dbx" as the underlying symbolic debugger is described as follows. To simplify the debugging process, a C macro DEBUG_UDF, is provided for application programmers to specify a minimum set of debugging information. The definition of DEBUG_UDF is as follows:

```
#define DEBUG_UDF(dbg, src_dirs, display, ulst, uarg, flag)    \
{                                                              \
    static int token;                                          \
    token = dbf_register(dbg, src_dirs, display, ulst, uarg);  \
    if (token >= 0)                                            \
        flag = dbf_trigger(token);                             \
}
```

Argument dbg specifies the name of the debugger; "dbx" and "xldb" are the two choices in this preferred embodiment. Argument src_dirs specifies a colon-separated list of UDF source directory names. Argument display specifies the user's X display as machine:display-number. Argument ulst specifies a colon-separated list of two-part UDF names. Argument uarg is the formal argument of the enclosing C function which contains the full function name of the UDF being executed. Argument flag is a local "int" variable name for holding the return code from the "trigger" routine whose sole functionality is to bring up the debugger.

It takes two statements to initiate the debugger.

The first statement registers the current debugging session with the DBMS. If the name specified by uarg is not in any of the existing registered debugging sessions, dbf_register will create a new session, and will register the debugging information as specified by the arguments. A token uniquely identifying this session will be returned as the result. If the name specified by uarg is found in some existing session, a token identifying that session will be returned as the result.

The second statement attempts to bring up the debugger if the current process is not being traced and no attempt was made before to bring up the debugger.

The following example shows the simplicity of debugging UDF with this invention:

```
#include "db2dbf.h"
void find_string
    char *text,         /*The text in which sub_string is searched */
    char *sub_string, /*The sub-string */
    long *position,   /*Position in text where sub_string occurs */
    short *null_ind_i1, /* First input null-indicator */
    short *null_ind_i2, /* Second input null-indicator */
    short *null_ind_r,  /* Result null-indicator */
    char sqlstate       /* Error code issued by UDF */
    char *udf_func_name, /* UDF function name */
    char *udf_spec_name, /* UDF specific name */
    char *msg text)      /* Msg. text returned by UDF */
{
    char *start, *cptr1, *cptr2;
    int   start_position;
    int   flag;
    DEBUG_UDF ("xldb",
                "/afs/alm/u/fuh/udf/LIB/src",
                "shaolin.almaden.ibm.com: 0",
                "FUH   .FIND_STRING",
                udf_func_name,
                flag);
    if (flag != 0)
        /* debugger was not brought up successfully */
        ...
    else
        /* debugger was brought up successfully */
        ...
    /* Start of function body */
    .
    .
    .
}
```

In the above program, "db2dbf.h" is the header file containing the definition of DEBUG_UDF and the function prototypes for dbf_register and dbf_trigger. The DEBUG_UDF line in the function body of find_string registers a new debugging session with the following debugging information:

Debugger: IBM xldb debugger.
Source directories: AFS directory '/afs/alm/u/fuh/udf/LIB/src'.
Client machine: RS6000/560 machine with the name "shaolin.almaden.ibm.com".
UDF name: The UDF FIND_STRING in schema FUH.

If all of this information is correct and "FUH .FIND_STRING" is invoked the xldb debugger will be brought up and break at the DEBUG_UDF line. As desired, the xldb window will be displayed on "shaolin.almaden.ibm.com" as long as the X server has granted the access permission to the DB2 server machine.

The uarg and ulst arguments of DEBUG_UDF are further described as follows. At runtime, uarg will point to a string which contains the complete two-part name of the UDF being invoked. If there are multiple UDFs sharing the same implementation, this argument identifies the one which is being invoked. Suppose there is another UDF "SLICK .FIND_STRING" which is also implemented by the same external function. With the ulst argument given in the above example, the DEBUG_UDF line will have no effect if the UDF being invoked is "SLICK FIND_STRING".

To summarize the usage of the debugging support, the UDF should be prepared as follows. Then once the library is installed, the next invocation of the UDF will initiate the selected debugger.

- Include the header file "db2dbf.h" in UDF source file.
- Add the DEBUG_UDF line as explained above to the UDF source file where the initial breakpoint is desired.
- Recompile with debug support activated (i.e., specify the -g option).
- Link UDF library with the shared library "libdbf.a".

DBMS-initiating Approach

In the externally-initiating approach, the debugging request is made from within external functions through an invocation to DEBUG_UDF. Such a request can not be withdrawn without modifying the source program. Furthermore, with the DEBUG_UDF line inserted into source program, every application running the UDF will be forced to run in the debugging mode.

This problem can be solved by integrating the debugging support with the DBMS. One way of achieving this is to introduce a new SQL construct which allows users to specify their debugging intent on a per-application basis:

```
DEBUG FUNCTION FUH.find_string, SLICK.find_string
USING XLDB
DISPLAY sand.stl.ibm.com: 0
SOURCE DIRECTORY /afs/alm/u/fuh/udf/LIB/src;
```

Like the DEBUG_UDF macro, the debug function SQL statement specifies a user's intent in debugging selected UDFs. It also improves the granularity of a debugging specification as the debug function is executed on a per-application basis. Therefore, different applications invoking the same UDF can independently choose whether to debug the function. Similar to the drop function SQL statement, function names can be specified in one of three ways: function name without signature, function name with signature, and function specific name. The function resolution scheme for the drop function statement also applies to the debug function statement. The scope of a debug function statement spans from where it appears to the end of the current application.

Another problem with the externally-initiating approach is that it restricts debugging a statement that references UDFs defined in different libraries. When the debugger is brought up for the first invoked UDF, there is no symbolic information available for those libraries which have not yet been loaded. Thus there is no way to set breakpoints in these libraries, and execution will not be suspended when the DEBUG_UDF line in such a library is reached. The only way to make this happen is to quit the debugger before such a DEBUG_UDF line is reached. This may not be pleasant if there are many libraries involved in a statement.

To solve this problem, the dynamic-loading scheme for UDF libraries is enhanced. Instead of loading one library at a time, all of the libraries associated with debugged UDFs of the current access section are loaded up front. With such an enhancement, the user can use a conventional debugger such as xldb to set breakpoints in the various UDF routines at the start of execution of the current statement. Once all of the breakpoints have been set, the user will select the continue command to allow the UDF process to continue execution until the first breakpoint is encountered. When the breakpoint is reached, the debugger will display the current state of the UDF process, and the user can then do all of the functions provided by the debugger.

Debugging External Programs using a Parallel and Distributed Debugger

Another preferred embodiment of the invention is based on the Parallel and Distributed Dynamic Analyzer (PDDA) debugger which is built on top of the xfdb/xcdb debugger and provides a seamless debugging environment for DCE applications. The technology employed in PDDA can be applied in the DB2/6000 environment to the debugging of UDF and stored procedures. This technology can also be extended to the debugging of a query language with control flow facilities such as SQL3.

The essence of the invention in this context is to spawn a debugging back-end process for servicing all of the debugging requests. Such a process runs on the DB2 server site and communicates with the database engine via shared memory and message queues. The communication scheme between the database engine and the debugging back-end are very similar to those of the UDF process.

In this preferred embodiment, the debugging server is running a debugging engine tailored to the DB2/6000 environment. Such a debugging engine is based on the debugging engine currently used in the PDDA debugger.

To understand the context of this invention in this preferred embodiment, a brief description of the architecture of PDDA follows. A more detailed description of the PDDA debugger is given further below.

Overview of the PDDA debugger

Figure 4:
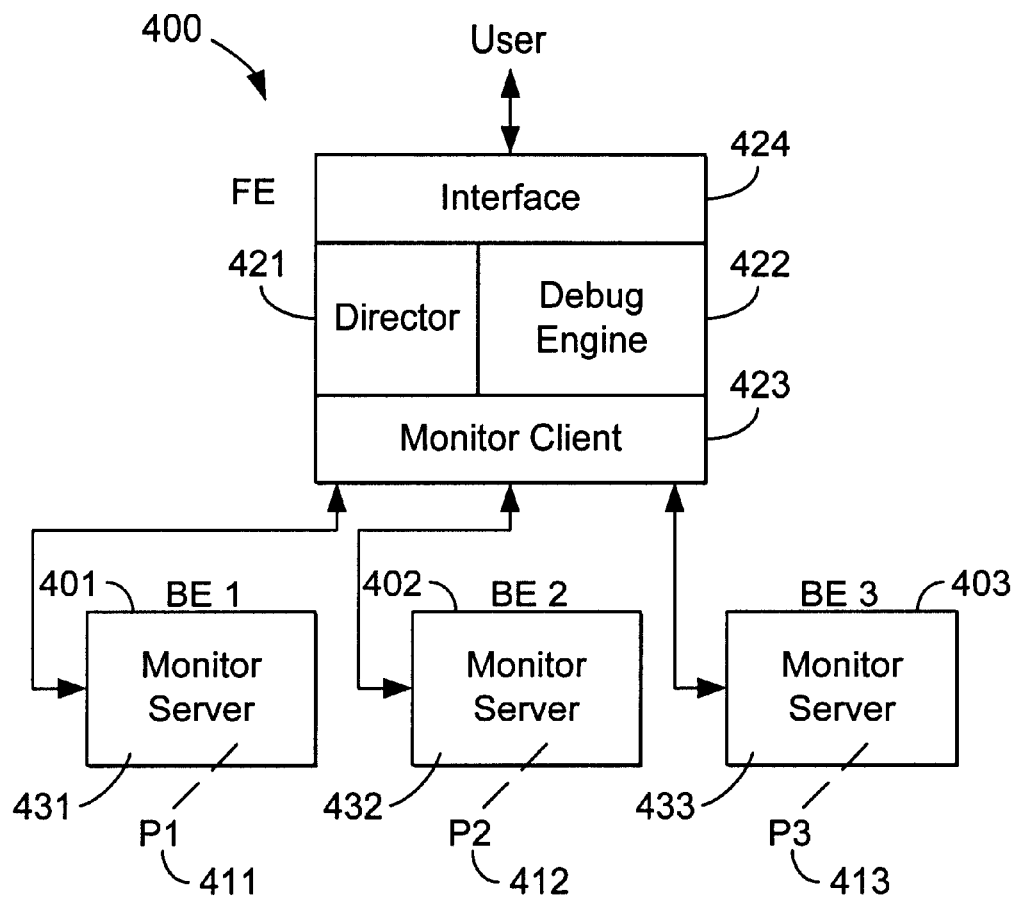
FIG. 4 illustrates the architecture of the Parallel and Distributed Dynamic Analyzer (PDDA) debugger.

A parallel and distributed debugger is, itself, a distributed application with a client-server architecture. A debugger named PDDA has been developed based on this architecture. The PDDA debugger includes a frontend 400 and one or more back-ends 401, 402, 403 as illustrated in FIG. 4. The front-end 400 provides a single user interface and handles most of the initialization and parallel execution control issues. The front-end 400 creates a back-end 401, 402, 403 for each program 411, 412, 413 involved in the application. The back-end 401 runs on the same machine as the application program 411. The back-end 401 carries out requests from the front-end 400 to monitor and control the application program 411. This includes: reading and writing the program state, starting and stopping the execution of the program, and monitoring the program for interrupts.

Back-End

A debugger back-end 401 is allocated for each program 411 (i.e., client or server program) that make up a parallel and/or distributed application. The creation of the back-ends 401 is done by the front-end 400 when it receives a request to provide debugging services for an application program 411. This is achieved by a dynamic connection to the debugger which is discussed in greater detail further below and is also the subject of Ser. No. 08/606,166 titled "Dynamic Connection to a Debugger in a Distributed Processing Environment" by Michael Meier and Hsin Pan filed on even date herewith.

Each application program 411 is monitored by its corresponding back-end 401 during the debugging session. The back-end will execute requests from the front-end to control the execution of the application program and read/write program state information.

An application program can create additional processes during execution (e.g., by invoking the UNIX "fork" system call). The process for the application program and all of its descendant processes are monitored by a single back-end. In addition, the back-end handles interrupt signals from those processes and passes information to the front-end as needed.

The communication between the front-end and the back-end can be implemented using any of a variety of standard communication protocols including TCP/IP, SNA, NETBIOS. The general model of the communication is Remote Procedure Call (RPC).

Front-End

The debugger front-end 400 is composed of the "Director" 421, "Debug Engine" 422, "Interface" 424, and "Monitor Client" 423 components. The Debug Engine 422 and Interface 424 components are based on the functionally corresponding components of a standard debugger for serial programs such as "dbx", XCDB or XLDB. The Director 421 and Monitor Client 423 components allow the Debug Engine 422 and Interface 424 components to be unaware of most of the parallel and distributed aspects of the application. The Interface component 424 must be extended to allow the user to display a list of programs that make up the parallel and distributed application. The user is also allowed to display the current state of one of those programs by selecting it from the list. The Interface component 424 will then call the Director 421 component to set the current context to the selected program. It will then obtain the current state of the selected program by calling the Debug Engine 422, and displaying it to the user. When the Debug Engine 422 is called by the Interface 424 component, it will make calls to the "Monitor Client" 423 component to get the program state information. The Monitor Client 423 component will then execute a Remote Procedure Call (RPC) to the "Monitor Server" 431 component running in the back-end 401 which reads the process state and returns it to the front-end 400.

In response to a start execution command (e.g., "Run", "Continue", "Line step", "Call step", "Return step") from the user, the Director component 421 will supervise the execution of the parallel and distributed application. It starts the application by sending commands to each back-end 401–403 to start or continue executing the processes they are monitoring. The director 421 will then poll the back-ends 401–403 for current status until one of the back-ends reports that a process it is monitoring has encountered a breakpoint, program interrupt, or termination. At that point, the Director 421 will stop the entire parallel and distributed application by sending "stop" commands to all of the other back-ends. Once all of the application programs 411–413 have been stopped, the Director sets the current context to the program that caused the application to stop. The user can then interact with the Interface component 424 to display and modify the frozen state of the various programs.

Debugging Environment of a Typical Database Application

Figure 5:
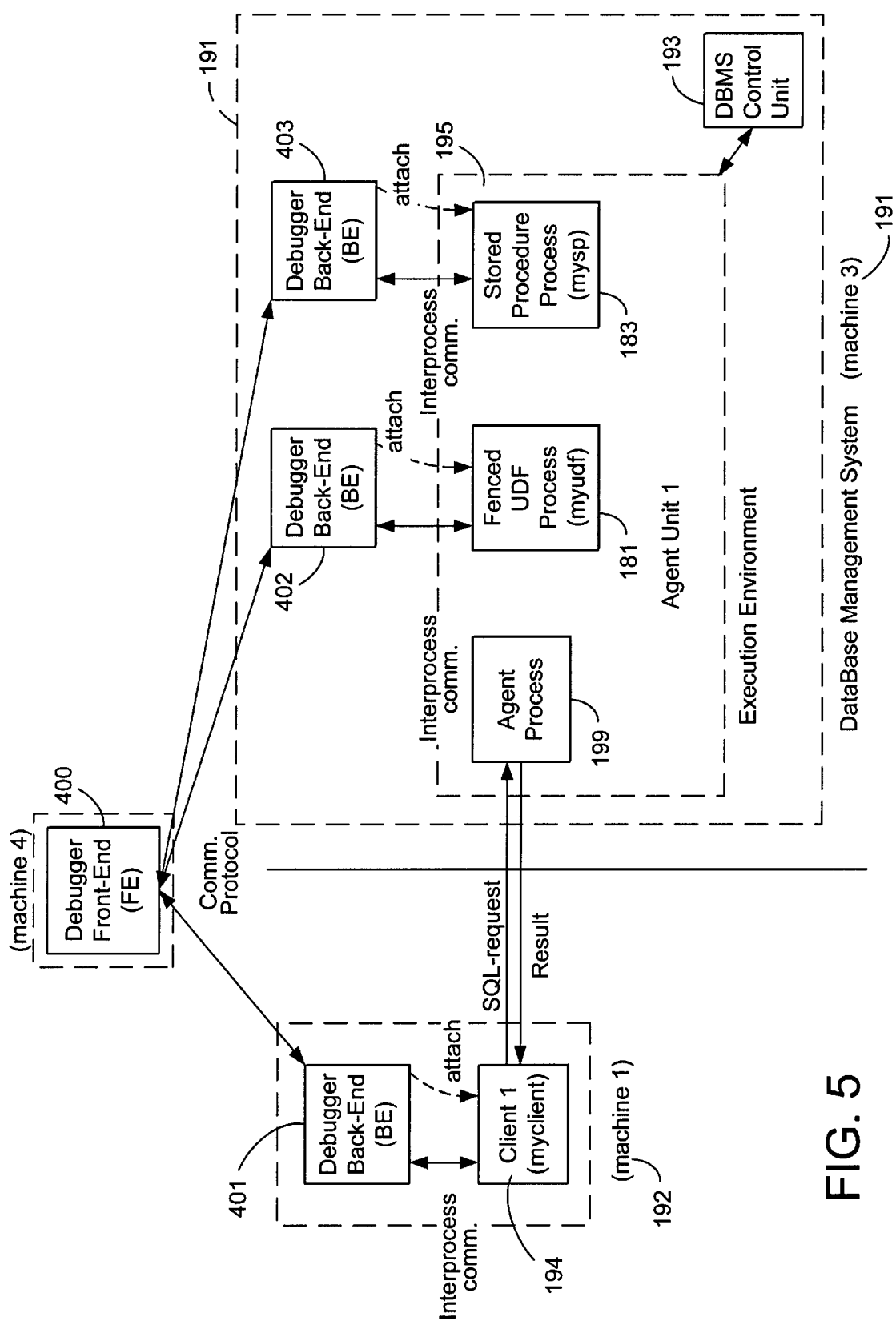
FIG. 5 illustrates a parallel and distributed debugger monitoring and controlling a stored procedure as shown in FIG. 2.

FIG. 5 shows a parallel and distributed debugger monitoring and controlling the example application shown in FIG. 2. The client program (myclient) 194 is running in a process on machine 1, 192. The database server has loaded the stored procedure (mysp) 183 and the fenced UDF (myudf) 181 in their own separate process on the same machine that the DBMS is running (i.e. machine 3), 191. A separate debugger back-end (BE) is "attached" to each of the processes that are running the client program, stored procedure, and user defined function. Just before a stored procedure or fenced UDF process is about to call an external program, it will "signal" the debugger by calling a routine that will execute a breakpoint instruction. In addition, after the external program returns, another breakpoint instruction will be executed in the stored procedure or fenced UDF process to notify the debugger that the external program has ended.

Figure 6:
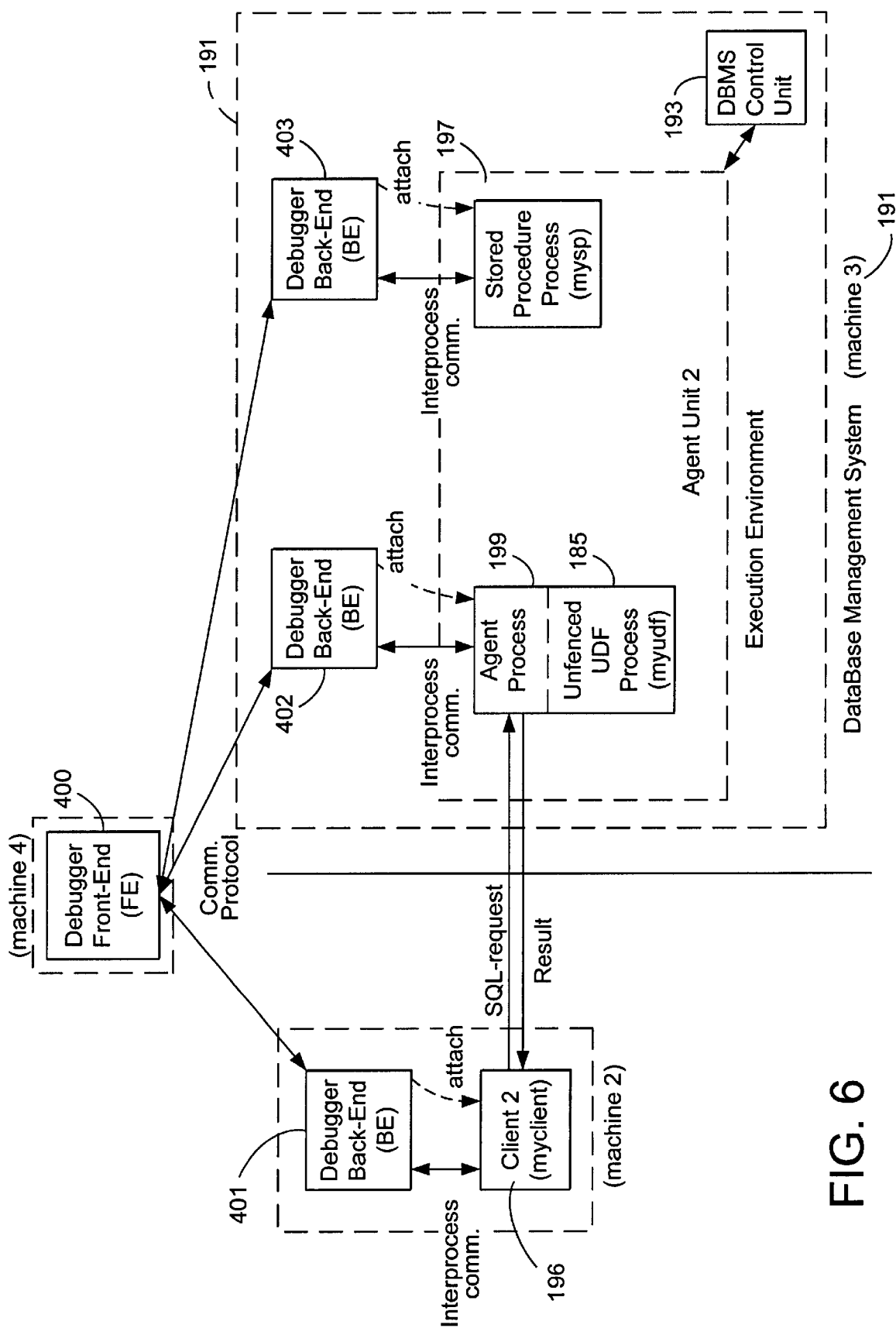
FIG. 6 illustrates a parallel and distributed debugger monitoring and controlling an unfenced UDF as shown in FIG. 3.

FIG. 6 shows the parallel and distributed debugger monitoring and controlling the example application shown in FIG. 3. Everything is the same as that shown in FIG. 5 except that the fenced UDF (myudf) 181 has been changed to an un-fenced UDF 185. In this case the un-fenced UDF 185 runs in the agent process 199, and therefore, the debugger back-end 402 is attached to the agent process 199.

Invocation Stack Frame

In order to access the internal state of a DBMS, e.g., DB2/CS server, the agent process (i.e., the database engine) will maintain, in shared memory, a stack of record structures of type INVSTKFRAME that are called invocation stack frames. The invocation stack frame provides access to a debugger to the internal state of a RDBMS. The motivation for the INVSTKFRAME structure is to construct a distributed call stack as described in Ser. No. 08/314,839 entitled "METHOD OF WAKING-UP A CALL STACK FOR A CLIENT/SERVER PROGRAM THAT USES REMOTE PROCEDURE CALL" filed on Sep. 29, 1994, whereby the call stacks for a client and server program are appended together into a single distributed call stack in the order they were created.

Each INVSTKFRAME record represents an invocation of a client program or an external program, including, for example, the host machine where the program is running, the process ID where the program is running, the user ID the program is running under, entry point of the external program, etc.. The INVSTKFRAME is analogous to an activation record in a call stack of a 3GL language. The most recently invoked client program or external program is represented by the INVSTKFRAME record at the top of the stack.

Figure 7:
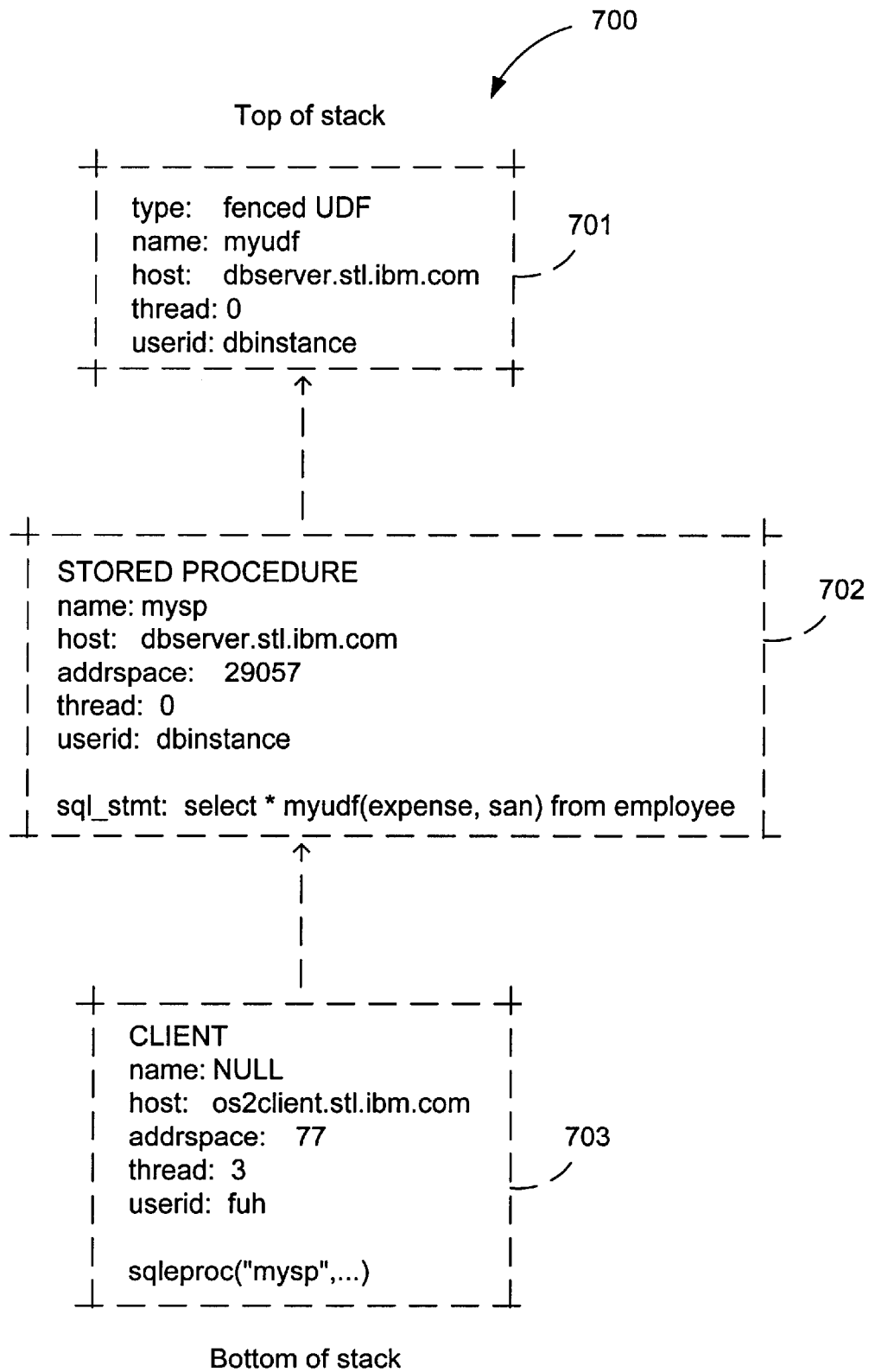
FIG. 7 represents the invocation stack for the example shown in FIG. 5.

For example, FIG. 7 represents the invocation stack 700 for the example shown in FIG. 5. In this case, the invocation stack contains three (3) INVSTKFRAME records, 701–703. FIG. 8 illustrates the C language type declaration for the INVSTKFRAME record 801.

At the top of the stack 700 is a INVSTKFRAME record 801 that represents the fenced UDF function 701. The next INVSTKFRAME record represents the stored procedure 702, and the record at the bottom of the stack represents the client program 703.

The debugger front-end can send a command to the back-end that will execute a debugger library routine named getInvStkFrame to read the INVSTKFRAME records from shared memory that are maintained by the DBMS and pass them back to the front-end. The syntax of getInvStkFrame is:

```
void getInvStkFrame(int framenum, INVSTKFRAME *frame, int status);
where:
framenum   A number used to determine which INVSTKFRAME record
           to retrieve. The INVSTKFRAME record at the top of the
           stack (i.e., most recent invocation) is number 1. The
           next record is number 2 and so on. If the frame number
           is greater than the number of INVSTKFRAME records on
           the stack, a status code of INVALID_FRAME_NUMBER
           is returned. This can be used to indicate when the bottom
           of the stack has been reached.
frame      A pointer to an INVSTKFRAME record where the
           invocation stack frame will be returned.
status     A status code. The valid values are:
           ERROR_STATUS_OK          No errors.
           INVALID_FRAME_NUMBER     There is no
                                    INVSTKFRAME
                                    record that
                                    corresponds to
                                    framenum.
```

Using the example shown in FIG. 7, assume the following SQL commands were previously supplied by the user, i.e., client program:

```
EXEC SQL SET DBENV DEBUGGERID =
    'os2client.stl.ibm.com/fuh/os2client.stl.ibm.com: 0/1'
       SOURCE  = '/u/fuh/mysrc:/u/hpan/srccode'
       OPTIONS = '-T /mytmpdir';
EXEC SQL DEBUG ON myudf AT FIRST CALL;
EXEC SQL DEBUG ON STORED PROCEDURE '/u/hpan/srccode/mysp';
```

Executing the following remote procedure call from the debugger:

getInvStkFrame(1, &frame, &status);

will return a INVSTKFRAME record for the user defined function. The fields of the INVSTKFRAME RECORD contain the following:

| | |
|---|---|
| type | The type of program that was invoked. In this case the value is 1 which represents a fenced UDF. |
| host | The host ID where the user defined function is executing. In this example, there is a TCP/IP network. Therefore, the value will be an internet protocol address which is "dbserver.stl.ibm.com". |
| addrspace | The address space ID where the user defined function is executing. In our example the user defined function will run on an UNIX machine. Therefore the value is the UNIX process ID which is 22576. |
| thread | The POSIX thread ID where the user defined function is executing. If the current implementation of DBMS does not support multiple threads, this value is set to 0. |
| userid | The user ID that the fenced UDF is running under. In this case the fenced UDF is running under the user ID of the DBMS instance. |
| sql stm_t | If the user defined function is in the middle of executing an SQL statement, this field will point to a string that contains a text representation of the SQL statement. If the user defined function is not currently executing a SQL statement, the value of this field is NULL. In this example, the user defined function does not execute any SQL statements, therefore the value of this field is NULL. |
| startexp | If the sql_stmt field is not NULL, then this field points to the beginning of the current expression that is being evaluated by the SQL interpreter. In this example, the sql_stmt field is NULL, therefore this field is not used. |
| endexp | If the sql_stint field is not NULL, then this field points to the end of the current expression that is being evaluated by the SQL interpreter. In this example the sql_stmt field is NULL, therefore this field is not used. |
| name | The name of the user defined function. In this example the name of the user defined function is "myudf". |
| ep | The entry point of the user defined function. |

To get next INVSTKFRAME record on stack, the debugger will execute the following call:

getInvStkFrame(2, &frame, &status);

which will return a INVSTKFRAME record for the stored procedure. The fields of the INVSTKFRAME RECORD contain the following:

| | |
|---|---|
| type | The type of program that was invoked. In this case the value is 3 which represents a stored procedure. |
| host | The host ID where the stored procedure is executing. In this example the value is "dbserver.stl.ibm.com". |
| addrspace | The address space ID where the stored procedure is executing. In this example the stored procedure will run on an UNIX machine. Therefore, the UNIX process id is used which is 29057. |
| thread | The POSIX thread ID where the user defined function is executing. If the current implementation of DBMS does not support multiple threads, this value is set to 0. |
| userid | The user ID that the stored procedure is running under. In this case the UDF is running under the user ID of the DBMS instance. |
| sql stm_t | In this example, this field points to a string which contains the SQL "SELECT" statement that invokes the user defined function "myudf". |
| startexp | Points to the beginning of the call to the user defined function "myudf" in the SQL statement. |
| endexp | Points to the end of the call to the user defined function "myudf" in the SQL statement. |
| name | The name of the stored procedure. In this example, the name of the stored procedure program is "mysp". |
| ep | The entry point of the stored procedure. |

Again, to get the next INVSTKFRAME record on stack, the debugger will execute the following call:

getInvStkFrame(3, &frame, &status);

which will return a INVSTKFRAME record for the client program. The fields of the INVSTKFRAME RECORD contain the following:

| | |
|---|---|
| type | The type of program that was invoked. In this case, the value is 0 which represents a client program. |
| host | The host ID where the client program is executing which is "os2client.stl.ibm.com". |
| addrspace | The address space ID where the client program is executing. In this example, the client program will run on an OS/2 machine. Therefore, the value of the OS/2 process ID is used which is 77. |
| thread | The POSIX thread ID where the client program is executing. |
| userid | The user ID that the client program is running under. |
| sgl stm_t | The call to the stored procedure is done via an API call to a library routine, and therefore, no SQL statement is executed. Therefore, this field is set to NULL. |
| startexp | Because sql_stmt is NULL this field is not used. |
| endexp | Because sql_stmt is NULL this field is not used. |
| name | Not applicable. |
| ep | Not applicable. |

Finally, the following call from the debugger:

getInvStkFrame(4, &frame, &status);

Invoking the Debugger

The client program is started by the debugger front-end running under a debugger back-end. After the client program has executed the "sqlconnect" command, a "SET DBENV" SQL command is executed specifying the DEBUGGERID of the debugger that the client program is running under. This will cause the "Dynamic Connection" service (described below) to send all "debug me" requests for the DBMS external programs to the same debugger that is debugging the client program. Next the client program will execute a SQL "DEBUG" command specifying the external programs to be debugged.

When the database server receives a SQL-request from the client program and debugging has been turned on, the DBMS creates an INVSTKFRAME record for the client program and fills in the fields. The record is then pushed onto the invocation stack as the first entry. Once the database engine determines that it is about to invoke an external program that requires debugging services, it will add an INVSTKFRAME record to the invocation stack filling in all of its fields. Just before the external program is to be executed, a call is made to a library routine named debuggerBeginExtProg in the process that the external program will be run in.

The syntax is:

```
    void debuggerBeginExtProg(int   *status) ;
where:
status   A status code. The valid values are:
         ERROR_STATUS_OK            No errors.
         CANNOT_START_DEBUGGER      Unable to start the
                                    debugger.
```

A check is made to determine whether or not a debugger back-end is currently attached to the process that will run the external program. If not, a request will be sent to the debugger front-end to attach a debugger back-end to the external program process using the "Dynamic Connection" service described below. Note, that in the case of an un-fenced UDF, the external program process is the agent process.

The debuggerBeginExtProg routine will then execute a breakpoint instruction to "signal" the debugger back-end that is attached to the external program process that an external program is about to be executed. The debugger back-end will in turn notify the debugger front-end. Executing a breakpoint instruction will cause the external program process to suspend its execution until the debugger front-end issues a "continue execution" command.

When the debugger front-end receives a notification that an external program is about to be executed, it will execute a getInvStkFrame Remote Procedure Call (RPC) to get the INVSTKFRAME record at the top of the stack. This record represents the external program that is about to be executed. The debugger will get the entry point of the external program from the INVSTKFRAME record and set a breakpoint there. It will then execute "continue execution" command for the external program process. The external program will immediately encounter the breakpoint that was previously set by the debugger. The debugger can use the getInvStkFrame routine to get the information that it needs to determine the context that the program is executing in, and then display the corresponding information to the user.

When the external program returns, a call is made to debuggerEndExtProg.

The syntax is:

```
    void debuggerEndExtProg(int   *status) ;
where:
status   A status code. The valid values are:
         ERROR_STATUS_OK            No errors.
         CANNOT_START_DEBUGGER      Unable to start the
                                    debugger.
```

Just as with debuggerBeginExtProg routine described earlier, it will execute a breakpoint instruction to "signal" the debugger back-end which will in turn notify the debugger front-end that an external program has just ended.

The debugger front-end will then execute a getInvStkFrame RPC call to get the INVSTKFRAME record at the top of the stack. This record represents the external program that just ended. If the external program is a stored procedure, it will "detach" the debugger back-end from the external program process.

This detach action is necessary for a DBMS that creates a set of processes which are used to run stored procedures from various clients (e.g., IBM DB2/6000). Therefore, the next stored procedure that is run in that process may be from a different client. The agent process and fenced UDF processes are not shared between clients, and therefore the debugger back-end can stay attached. The debugger will simply execute a "continue execution" command for the external program process.

To summarize, invoking the debugger involves the following steps:

1. Supplying the following SQL commands by the client program:

```
EXEC SQL SET DBENV DEBUGGERID =
'os2client.stl.ibm.com/fuh/os2client.stl.ibm.com: 0/1'
        SOURCE   = '/u/fuh/mysrc:/u/hpan/srccode'
        OPTIONS  = '-T /mytmpdir';
EXEC SQL DEBUG ON myudf AT FIRST CALL;
EXEC SQL DEBUG ON STORED PROCEDURE '/u/hpan/srccode/mysp';
EXECsql call MYSP (ARG1,ARG2, . . .);
```

2. RDBMS creates an INVSTKFRAME for the client (myclient).
3. RDBMS creates an INVSTKFRAME for the stored procedure (mysp).
4. RDBMS call "debuggerBeginExtProg" which will ensure the debugger back-end is attached to the process that runs mysp and then will signal the debugger back-end.
5. The debugger will execute a series of "getInvStkFra" to get the RDBMS internal state.
6. When the external program returns, RDBMS call "debuggerEndExtProg" to signal the debugger back-end which in turn will notify the debugger front-end that the external program has just ended.
7. The debugger front-end will execute a "getInvStkFra" to get the record at the top of the stack, then "detach" the back-end from the external program process.

Implementation

The following is a description of the implementation of the invention for DB2 on RISC System/6000.

Triggering Mechanism

The debugging environment of external programs is determined by a set of environment attributes which specifies an instance of a debugger to connect to (refer to the section titled "Tool Locator" in the description below of a "Dynamic connection to a debugger in a distributed environment"), the location of the source code of the external programs, and the command options the debugger is provided when it is connected.

At application-creation time, each environment attribute is assigned a default value: the identification of the debugger instance is constructed such that it will locate the same debugger that the client was brought up under, the default source directory is the directory where the executable is located, and the default command options associated with the debugger is a null-string.

The value associated with an environment attribute can be redefined by the use of the "SET DBENV" command. The following grammar rules defines the syntax of the "SET DBENV" command.

```
set_dbenv_stmt:
    SET DBENV environment_attr_list ;
environment_attr_list :
    environment_attr |
    environment_attr_list , environment_attr ;
environment_attr :
    DEBUGGERID  = string      |
    SOURCE      = string      |
    OPTIONS     = string ;
```

For example, the following command:

```
SET DBENV DEBUGGERID = 'machine1/fuh/machine2: 0/1',
          SOURCE = '/u/fuh/udf_src:/u/hpan/sp_src',
          OPTIONS = '-T  /u/fuh/mytmpdir';
``` will direct the system to use the instance of the debugger that has registered with the "Dynamic Connection" service (described below) with a key of machine1/fuh/machine2:0/1. The debugger will search directories '/u/fuh/udf_src' and '/u/hpan/sp_src' for the source code of the external programs. The options "-T /u/fuh/mytmpdir" will be passed to the debugger.

Besides environment attributes, there is also a set of triggering attributes which specifies the intent of debugging a program and the condition in which the program is desired to be debugged. The default debugging intent of an external program is not to debug the program. The default debugging condition is the TRUE condition meaning that the associated program will always be debugged at execution-time if the debugging intent is ON. Both the debugging intent and the debugging condition can be re-defined by the use of the "DEBUG" command.

```
debug_stmt :
   DEBUG debug_intent program_ref_clause debug_condition   ;
debug_intent   :
   ON   |
   OFF   ;
program_ref_clause   :
   STORED PROCEDURE sp_ref_list   |
   FUNCTION function_ref_list   ;
debug_condition   :
   WHEN parameter_exp   |
   AT int_constant   CALL;
```

In the grammar rules above, parameter_exp represents a boolean function defined over the formal parameters of the associated UDF, and int_constant is an integer literal specifying the iteration in which the associated UDF is invoked in current statement. As such, debugging condition can not be specified for a stored procedure.

The following examples demonstrate the use of the "DEBUG" command:

EXAMPLE 1

```
DEGUG ON FUNCTION udf_integer, udf_float   ;
```

The selected functions will be debugged every time it is executed.

EXAMPLE 2

```
DEBUG ON FUNCTION SPECIFIC udf_integer, SPECIFIC udf_float
WHEN #1 = 0 ;
```

The selected functions will be debugged if the first parameter is equal to 0.

EXAMPLE 3

```
DEBUG ON FUNCTION my_udf
    AT 1 CALL ;
```

The selected function will be debugged at the first time it is invoked in a statement.

EXAMPLE 4

```
DEBUG OFF STORED PROCEDURE '/u/fuh/sp/sp_lib/my_sp'   ;
```

Further invocation of the selected stored procedure will not be debugged.

As described above, the control of debugging activities is fully integrated into the underlying DBMS. Several advantages are offered by such an integrated debugging environment. First of all, debugging control is specified using SQL command, meaning that no changes need to be made in external programs. As a result, neither re-compilation nor re-linking is required for expressing or withdrawing debugging intent. Secondly, conditional debugging, i.e., "conditional break point," specified in terms of SQL context can be efficiently supported. It would be very difficult, if not impossible, to support this feature without such an integration between debugger and DBMS, e.g., DB2/CS. Also, since debugging activity is controlled by DBMS, authority checking currently adopted in controlling database operations can be easily extended to control the debugging requests. Therefore, database security can be preserved in the presence of debugging support. Finally, because of the centralized debugging control, various parts (stored procedure, UDF, and the host program) of the application can be monitored under the same debugging window by interacting DBMS with an appropriate distributed debugging engine.

Attaching Mechanism

The following is the "C" source for routines that are executed in the process that will run the external program just before the external program is about to begin or just after the external program has ended.

```
static int IsDebuggerStarted = NO;
static void handleSIGTRAP (int sig)
{
   IsDebuggerStarted = NO;
}
void debuggerBeginExtProg ()
{
   if (IsDebuggerStarted == YES)
```

```
                    -continued kill(getpid(), SIGTRAP);
            if (IsDebuggerStarted == NO) {
               debugMe (. . .) ;
               IsDebuggerStarted = YES;
               signal (SIGTRAP, handleSIGTRAP) ;
               kill (getpid(), SIGTRAP) ;
            }
         }
         void debuggerEndExtProg()
         {
            kill (getpid(), SIGTRAP) ;
         }
```

The first time the debuggerBeginExtProg function is called, the following will occur:

1. A call will be made to a library routine named debugMe to request that a debugger back-end be "attached" to the external program process (for a description as to how this is done, refer to the description below of a "Dynamic connection to a debugger in a distributed processing environment).
2. The flag named IsDebuggerStarted is then set YES to indicate that the debugger back-end is now attached to the external program process.
3. A signal handler is established for SIGTRAP to allow subsequent calls to the debuggerBeginExtProg routine to determine if the debugger back-end needs to be re-attached (this is further explained below).
4. The debuggerBeginExtProg routine then sends a SIGTRAP signal to the current process to notify the debugger that a external program is about to be executed.

On subsequent executions of the debuggerBeginExtProg routine, the external program process will simply send a SIGTRAP signal to itself. If the debugger back-end is no longer attached to the external program process (e.g., the user executed a debugger "quit" command), then the routine handleSIGTRAP, which is the signal handler for SIGTRAP that was established earlier, will be executed. This routine will set the IsDebuggerStarted flag to NO which causes the debuggerBeginExtProg routine to repeat the steps to attach a debugger back-end to the external program process.

Once the external program process sends the SIGTRAP signal to itself with the debugger "attached", the AIX/6000 debugging support will freeze the external program process and notify the debugger. The debugger will then execute a getInvStkFrame RPC call to get the most recent INVSTK-FRAME record. For example:

getInvStkFrame(1, &frame, &status);

The debugger will use the information in the INVSTK-FRAME record to set a breakpoint at the beginning of the external program. It will then use the AIX/6000 debugging support to allow the external program process to ignore the SIGTRAP signal (i.e., don't execute the handleSIGTRAP routine) and continue execution.

The external program process will then start the execution of the user defined function or stored procedure which will eventually encounter the breakpoint previously set by the debugger at the entry point. The debugger will execute a series of getInvStkFrame RPC calls to obtain the current DB2 context which it will display to the user along with the frozen program state. The user can then use any function provided by the debugger such as display variables, setting breakpoints, etc.

The implementation of the getInvStkFrame routine will exploit the shared memory support in AIX/6000 to obtain the invocation stack frames from DB2. DB2 will ensure that invocation stack frame records are properly maintained in shared memory whenever debugging mode is on for any external program. The getInvStkFrame routine can obtain these records by simply reading the shared memory on the server machine that the external programs are running on.

Summarized Method of Operation

With reference to FIG. 5 and FIG. 7, a summary of the steps that are performed by the application program 194, DB2 191, and the debugger 400–403 is shown.

1. Myclient program 194 is started by the debugger front-end 400 running under the debugger back-end 401.
2. Myclient program 194 calls a stored procedure 183.
   (a) Issues a SQL "CONNECT" command which will create a DB2 agent process 199.
   (b) Issues a SQL "SET DBENV" command specifying environment variables such as specifying the ID of the debugger that the client is running under, the location of the source code of the external programs, and the debugging options. Usually, the user will want to specify that all requests for debugging services be sent to the same distributed debugger front-end that is debugging the client program.
   (c) Issues a SQL "DEBUG" command specifying that the external programs "mysp" and "myudf" are to be run in debugging mode. (d) Calls "sqleproc" to execute a stored procedure named "mysp".
3. The agent process creates an INVSTKFRAME record for the corresponding client program after receiving the SQL-request (e.g., "sqleproc") from a client site, fills in all of the information, and pushes it onto the invocation stack which was empty.
4. Agent process executes the stored procedure.
   (a) The agent process loads the program named "mysp" into a stored procedure process (i.e., a DARI process).
   (b) The agent process creates an INVSTKFRAME record, fills in all of the information, and pushes it onto the invocation stack.
   (c) The agent process tells the stored procedure process to execute the "mysp" routine under the debugger.
   (d) The stored procedure process calls the debuggerBeginExtProg routine which will:
      i. Check to see if a debugger back-end is attached to the stored procedure process. If not, issue a "debug me" request to the debugger front-end to attach a debugger back-end to the stored procedure process;
      ii. Tell the debugger that an external program is about to be executed by sending a SIGTRAP signal to the current process (i.e., the DARI process).
   (e) The debugger detects that the SIGTRAP signal is from the debuggerBeginExtProg routine. The debugger will then:
      i. Gets the INVSTKFRAME record at the top of the invocation stack;
      ii. Get the entry point of the stored procedure from the INVSTKFRAME record and set a breakpoint there;
      ii. Continue the execution of stored procedure process.
   (f) The stored procedure process will then start the execution of the stored procedure (i.e., "mysp").
   (g) The stored procedure encounters the breakpoint that was set at its entry point by the debugger.
   (h) The debugger detects the breakpoint and displays the current state of the program to the user. The user can set other breakpoints in the stored procedure display or modify variables etc. The user then executes a debugger "continue execution" command.

i. The stored procedure executes a SQL "SELECT" command that contains a call to the UDF named "myudf".
5. Agent process executes a UDF. The steps for executing a fenced UDF are exactly the same as those for the stored procedure except that the fenced UDF program is loaded into a UDF process and the debugger back-end is attached to it. The steps for executing an un-fenced UDF are also exactly the same as those for the stored procedure except that the un-fenced UDF program is loaded into the agent process and the debugger back-end is attached to it.
6. End UDF.
   (a) The agent process deletes INVSTKFRAME record from the top of the invocation stack.
7. End Stored Procedure.
   (a) The stored procedure process calls the debuggerEndExtProg routine which will tell the debugger that an external program has just ended by sending a SIGTRAP signal to the current process (i.e., the DARI process).
   (b) The debugger detects the SIGTRAP signal sent from the debuggerEndExtProg routine. The debugger will then:
      i. Get the INVSTKFRAME record at the top of the invocation stack;
      ii. Get the information from the INVSTKFRAME record that tells what type of external program just ended. If it is a stored procedure, the debugger will detach the back-end from the stored procedure process so that DB2 can re-use it for another DB2 client.
   (c) The agent process deletes INVSTKFRAME record from the top of the invocation stack.

To support the debugging of external programs, a set of extensions to a distributed debugger, SQL language, and a relational database engine, e.g., DB2/CS, has been described above. In the DBMS-initiating approach, the user does not need to make any modification to the source code of the external programs. A user does, however, need to recompile the external programs with the compiler debugging option turned on (e.g., the "-g" option of the AIX C compiler). In most cases, the user will also want to add some additional SQL statements to the client program to activate debugging for the external programs and to set certain debugging options.

The extensions to the distributed debugger include a mechanism that allows the database engine to invoke a debugger library routine named debugMe to request debugging services from a distributed debugger that may be running on a different machine. The distributed debugger can then "dynamically attach," as described below, to the process that is running the external program.

The debugMe routine will locate the distributed debugger based on information specified by the user and send it a message which contains all of the information necessary for the distributed debugger to locate the process that is running the external program including, for example, the host ID of the machine and the AIX process and thread ID. Also included is the information necessary to obtain authorization for the debugger to attach to the process that is running the external program (i.e., login ID and password) as well as the instruction address in the external program where the debugging session should begin (e.g., the entry point of the external program).

The extensions to DB2/CS includes enhancements to the SQL language and the database engine. The enhancements to the SQL language include a new "SET DBENV" statement which the user can invoke from a client program to set various environment variables. Some of these environment variables are used by the debugMe routine to locate a debugger in a distributed environment and specify various options to the debugger. There is also a new "DEBUG" SQL statement which the user can invoke from the client program to indicate which external programs the database engine should request debugging services for, and under what conditions.

The extensions to the database engine allow the debugger to retrieve the internal state of the DB2/CS database engine at run-time. The internal state is presented to the debugger as a set of data structures that are analogous to the caller stack of the C language runtime. These data structures are maintained by the database engine in shared memory which is accessible to the debugger. Using these data structures, the debugger can determine, for example, the calling sequence (e.g., A DB2/CS client program invokes a stored procedure which in turn executes a SQL statement that executes a user-defined function etc.)

As described above, systems, methods, and programs have been disclosed that make the internal state of RDBMSs, distributed transactions or other software systems, having the ability to handle calls to other programs synchronously (either immediately or after a period of waiting time), accessible to an application development tool such as a debugger. In addition, the causal relationship between the RDBMS SQL command, external programs, and SQL connection can be represented. For example, the relationship of a client program executing a stored procedure, and the stored procedure then executing a SQL command which executes a user defined function, can be shown. Furthermore, if the user defined function executes a SQL connect to another RDBMS, and then executes a SQL command, the top of the invocation stack of the other RDBMS would show the location of the client application.

The security of the internal state is preserved since the debugging environment and debugging commands are given through extensions of SQL whereby the same authorization controls are invoked as for other SQL functions through the authorization of the initial SQL connect command. More specifically, RDBMS external programs can be debugged in a secure fashion through SQL extensions such as SQL SET DBENV and SQL DEBUG ON which provides checking authority under the control of the DBMS.

Furthermore, as shown above, the attachment and/or detachment of a distributed debugger to a process that runs an external program can be initiated by the external program itself or by other programs through enhancements to the database engine and extensions to SQL. Also, the debugging of external programs can be conditionally activated such as at the occurrence of certain events or at an external program's first invocation through a WHEN clause of the SQL extension.

Using the foregoing specification, the invention may be implemented using standard programming and/or engineering techniques using computer programming software, firmware, hardware or any combination or subcombination thereof. Any such resulting program(s), having computer readable program code means, may be embodied within one or more computer usable media such as fixed (hard) drives, disk, diskettes, optical disks, magnetic tape, semiconductor memories such as ROM, Proms, etc., or any memory or transmitting device, thereby making a computer program product, i.e., an article of manufacture, according to the invention. The article of manufacture containing the computer programming code may be made and/or used by executing the code directly from one medium, by copying the code from one medium to another medium, or by transmitting the code over a network.

An apparatus for making, using, or selling the invention may be one or more processing systems including, but not limited to, cpu, memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention. While the preferred embodiment of the present invention has been illustrated in detail, it should be apparent that modifications and adaptations to that embodiment may occur to one skilled in the art without departing from the spirit or scope of the present invention as set forth in the following claims. For example, although the invention has been described with reference to external programs written in a 3GL language, the invention would also be applicable to programs written in interpretive languages such as SQL3 as long as the interpreter had debugging support. Also, although the invention has been described with respect to distributed applications running in a distributed environment, the invention is applicable to application programs running on a single machine.

Description of a Dynamic Connection to a Remote Tool in a Distributed Processing System Environment This invention relates to systems, methods, and programs for utilizing application development tools in a client/server and/or distributed processing system environment, and more generally, in a network of processing systems, and more specifically, for utilizing a debugger to debug parts of application programs that may run on different machines in such an environment.

Background

Currently, there is no practical method for debugging external programs. The current practice is to write a test driver program which simulates the DB2/CS call to the external program.

The main problem with debugging external programs is that the external programs are executed under the control of the database engine which is itself a large software system for which no source code is provided. It is therefore impractical for a debugger to penetrate through the layers of software of the database engine to locate and debug the external programs. It is also very difficult for the debugger to determine when an external program will be invoked by the database engine and which process it will be run in. External programs are not statically linked with any executable module. Instead, they are dynamically loaded by the database engine at run-time when the associated UDF or stored procedure is about to be invoked which further complicates the situation for the debugger. In addition, in an environment where the DBMS is shared between a large number of users, it is necessary to ensure that the debugger does not violate the security of the DBMS or the underlying operating system.

Debugging multi-threaded applications in a distributed environment is known. One approach is to attach a debugger to the main software system and attempt to penetrate all of the software layers to get to the desired part of the program to be debugged. Another approach will stop execution in all of the threads and processes in order to debug an application running in one of the threads. Stopping the execution of processes in a single user environment may be acceptable, but such an approach is unacceptable in multi-user environments or where hundreds of processes may be running as in a CICS transaction monitoring system.

The Parallel and Distributed Dynamic Analyzer (PDDA) is a parallel and distributed debugger that can debug parallel and distributed applications including distributed middleware (e.g., CICS/6000, DCE and DSOM) and DB2/6000 application programs that use RPC and threads.

It is also known to have "application program initiating" debugging wherein an application program, itself, requests the services of a serial debugger when the debugger and application are running on the same machine.

However, it is not known to have an application program, itself, initiate debugging in a distributed environment where the debugger may be running on a different machine, or on several machines, different from the machine the application program is running on. Furthermore, it is not known to have "program-initiating" debugging for RDBMs external programs or transaction programs in a distributed environment. In a distributed environment, a problem arises in not being able to locate the machine or process within the machine that a desired debugger is running on. This difficulty is similar for locating any application development tool desired by an application running in a distributed processing environment.

Summary

It is an object of this invention to provide a mechanism for locating tools in a distributed environment and to have the capability to send the tools messages.

It is a further object of this invention to have an application program initiated debugging mechanism in which an application program requests debugging services from a remote debugger in a distributed environment.

It is a further object of this invention to have an application program initiated debugging mechanism in which a software system requests debugging services from a remote debugger on behalf of an application program in a distributed environment.

It is a further object of this invention to dynamically connect, at run time, an application program requesting debugging services from a debugger meeting a specified criteria of properties wherein the debugger may be active, if at all, on any machine within a network of processing systems.

This invention allows an user program to locate tools in a distributed environment and to send the tools messages. It provides a mechanism that allows users to add a statement to their program to invoke a tool library routine to request services from a tool that may be running on a different machine in the distributed environment. Additionally, a program may request services from a tool on behalf of another program. The preferred embodiment discloses the invention with respect to a tool such as a debugger. However, the invention is applicable to other tools including, but not limited to, trace collection tools and compilers. Although the preferred embodiment discloses the invention in context of external programs running in a relational database management system (RDBMS) and transaction programs running in a transaction monitoring system, the invention is applicable to other database management systems (DBMS) including, but not limited to, object-oriented database systems, to distributed objects, to other transaction monitoring systems, to message queuing systems, and to other software systems, in general.

The invention is an "application program initiated" debugging mechanism. A typical implementation may include both a debugger initiated mechanism and the application program initiated debugging mechanism of this invention. For example, a debugger may initiate debugging with a client program. However, when the client program invokes a software system (e.g., a database management system, transaction monitoring system, or a message queuing system) and application programs are then executed under the control of the software system, the application programs can initiate a debugging session, or the software system can initiate the debugging session on behalf of the application programs.

More specifically, a first aspect of this invention allows a user program to initiate a request for debugging services and to locate a debugger that may be running on a different machine. This invention allows users to add a statement to their program in order to invoke a debugger library routine ("debugMe") to request debugging services from a debugger. After receiving the request, the debugger will dynamically attach a monitor/controller to the user's program and begin a debugging session. For example, after a CICS transaction begins executing in a CICS application server process, the user's transaction program calls a debugger library routine named DEBUGME to locate and send a message to a particular debugger requesting debugging services. The debugger will attach a monitor/controller to the application process that executed the debugMe routine and add an entry for that process to a list of processes that it's debugging.

A second aspect of this invention allows a program to request debugging services on behalf of another program by invoking a library routine ("debugIt"). For instance, the software system can request debugging services on behalf of an application program. In this case, the user's application program does not need to be modified. For example, after a CICS transaction is dynamically loaded into the CICS application server process, CICS can call a debugger library routine named DEBUGIT to send a message to a particular debugger. The call to the debugIt routine specifies all of the information necessary for the debugger to locate the user's program including the internet ID of the machine, address-space ID (e.g., UNIX process ID), and thread ID. Also included is the information necessary to obtain authorization for the debugger to attach a monitor/controller to the user's program (i.e., login ID and password) as well as the instruction address in the user's program where the debugging session should begin (e.g., the entry point of the user's program). The debugger would then attach a monitor/controller to the application process and add that process to the list of processes it is debugging.

To locate a debugger, a tool locator mechanism is used. To locate a debugger, the tool locator can identify a machine and a port (typically, also the process) within a machine in which a debugger is running. The tool locator returns a communication endpoint address of a desired debugger so that a connection can be established with the debugger. The program sends a search criteria to the tool locator to identify which debugger it wants, such as a debugger that is running on a certain machine. The tool locator, will then return a session list which is a list of all debuggers that meet the search criteria requested.

In a preferred embodiment, the invention is used in conjunction with a parallel and distributed debugger having a front-end that is running on different machine than the machine running the program to be debugged. A program initiates a first routine that identifies a program to be debugged, and then initiates a second routine to locate, via the tool locator, a front-end of a debugger to have a back-end of the debugger from another machine attach to the program to be debugged.

In this way, a dynamic connection can be made, at run time, within a network of processing systems, between an application program and a remote tool. The application program can initiate the request for services of a desired tool without knowing, initially, the location of the tool within the network. The tool locator provides the information necessary, independently of the application program, to make the dynamic connection at run time between the application program and a remote tool.

DESCRIPTION OF THE PREFERRED EMBODIMENT

A preferred embodiment of the invention integrates the invention into a Parallel and Distributed Dynamic Analyzer (PDDA) debugger to debug distributed middleware (e.g., CICS/6000, DCE, and DSOM) and DB2/6000 application programs. Although the preferred embodiment of the invention is based on the PDDA debugger, any distributed and/or parallel debugger could be implemented together with this invention. Also, a serial debugger could be implemented with this invention as it is known to adapt serial debuggers to a distributed environment. In addition, although the following invention is described with reference to a debugger, the invention can be implemented with any application development tool such as trace collection tools, compilers, etc..

To understand the context of this invention, a brief description of the architecture of PDDA follows. A more detailed description of the PDDA debugger is given further below.

Overview of the PDDA debugger

Figure 9:
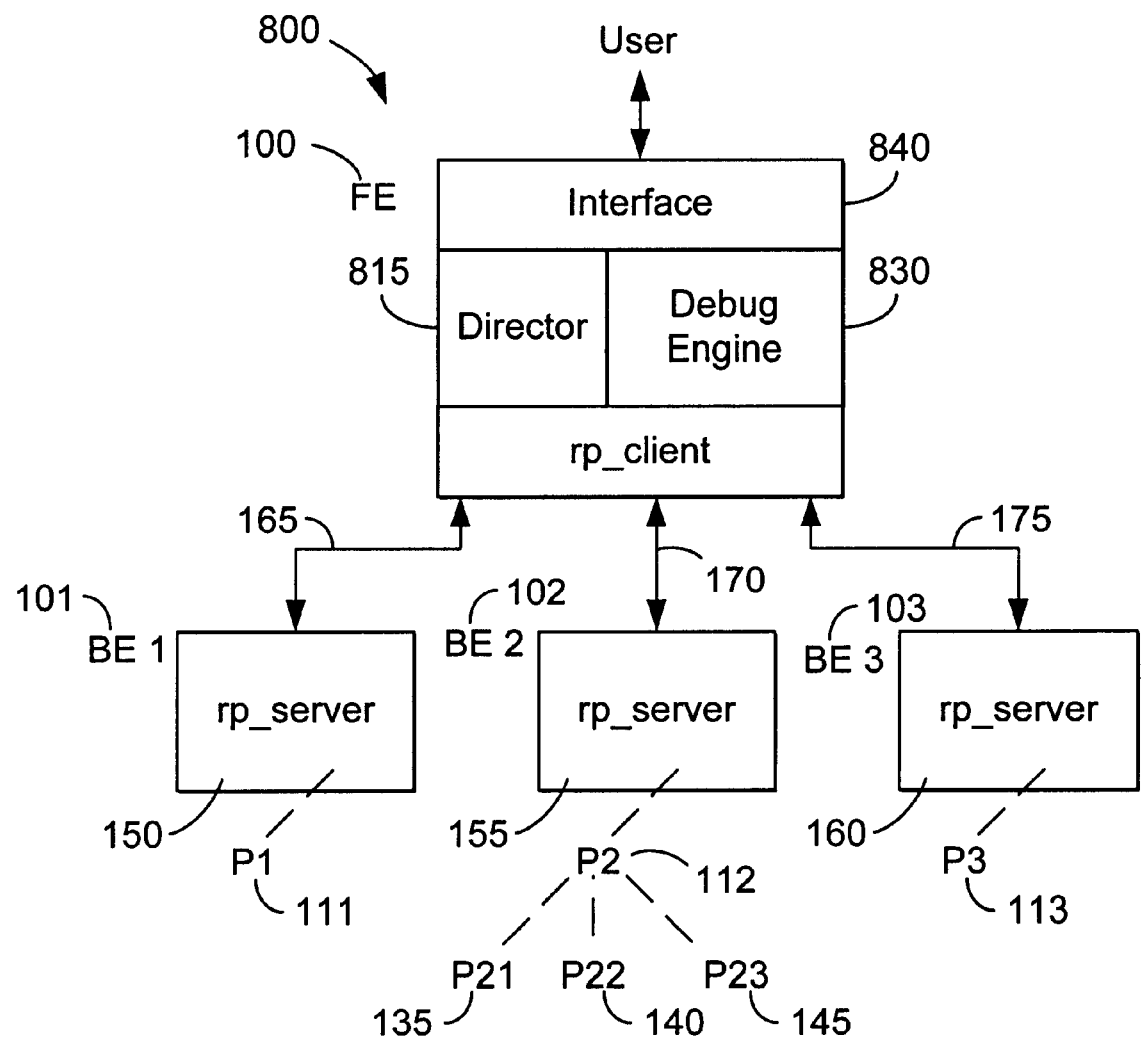
FIG. 9 is pictorial block diagram representation of a debugger component architecture of the Parallel and Distributed Dynamic Analyzer (PDDA) debugger for multiple client/server programs in accordance with the present invention.

PDDA is a debugger for parallel and distributed applications using Open Software Foundation's Distributed Computing Environment (DCE). The PDDA debugger has also been extended to support the debugging Distributed System Object Model (D-SOM) application. As shown in FIG. 9, the PDDA debugger includes a front-end 100 and one or more back-ends 101, 102, 103 which are attached to the processes that are running the application programs using the underlying debugging support of the operating system (e.g., the AIX/6000 "ptrace" function). The back-ends provide functions of monitors/controllers as illustrated in FIG. 9. The front-end 100 provides a single user interface and handles most of the initialization and parallel execution control issues. The front-end 100 creates a back-end 101, 102, 103 for each program 111, 112, 113 involved in the application. The back-end 101 runs on the same machine as the application program 111. The back-end 101 carries out requests from the front-end 100 to monitor and control the application program 111. This includes: reading and writing the program state, starting and stopping the execution of the program, and monitoring the program for interrupts (e.g., breakpoint, floating point exception, etc.).

Overview of the Invention

A back-end 101 (FIG. 9) can either be created during debugger initialization or it can be created dynamically during the debugging session by using this invention. When the back-end is created during initialization, the program to be monitored and controlled must be specified at initialization. When the back-end is created dynamically, the program to be monitored and controlled is NOT specified at debugger initialization; instead the program will call a debugger library routine to request debugging services from a particular instance of a distributed debugger. A program can request debugging services for itself or for another program.

One of the major extensions to the distributed debugger that was needed to support the debugging of DB2/CS external programs is the herein described "Dynamic Connection" component. This component enables an application program to locate a distributed debugger front-end in a distributed environment at run-time and to send it a message requesting debugging services. The debugger will then attach a back-end (monitor/controller) to the process for which debugging services is requested.

Architecture of the Invention

The following are definitions of various terms that will be used to describe this invention:

| | |
|---|---|
| DEBUGEE | A program that is to be debugged. |
| DEBUGGER SERVER | A program that provides debugging services (e.g., a distributed debugger front-end). |
| DEBUGGER CLIENT | A program that sends a request to a debugger server to start a debugging session on a debugee. The debugee can be the debugger client itself, ar another program running anywhere on the network. |
| MONITOR/CONTROLLER | A program that is attached to the debugee by the debugger server to monitor and control its execution and read and write state information (e.g., a distributed debugger back-end). |

The debugger client will call a debugger library routine to send a message to a debugger server that contains the information necessary for the debugger server to locate the debugee and obtain authorization to start a debugging session. Additionally, the message will include the instruction address in the debugee where the user would like the debugging session to begin (e.g., the current instruction address of the debugee or at entry to a routine in the debugee program).

The debugger server may or may not be running on the same machine as the debugee. To locate the debugger server a component named TOOL LOCATOR is used. The debugger client and debugger server can communicate with the tool locator through a socket connection such as a connectionless internet family socket that is bound to an internet address specified in an environment variable named TOOLLOCATORHOST, and a reserved well-known port.

Figure 10:
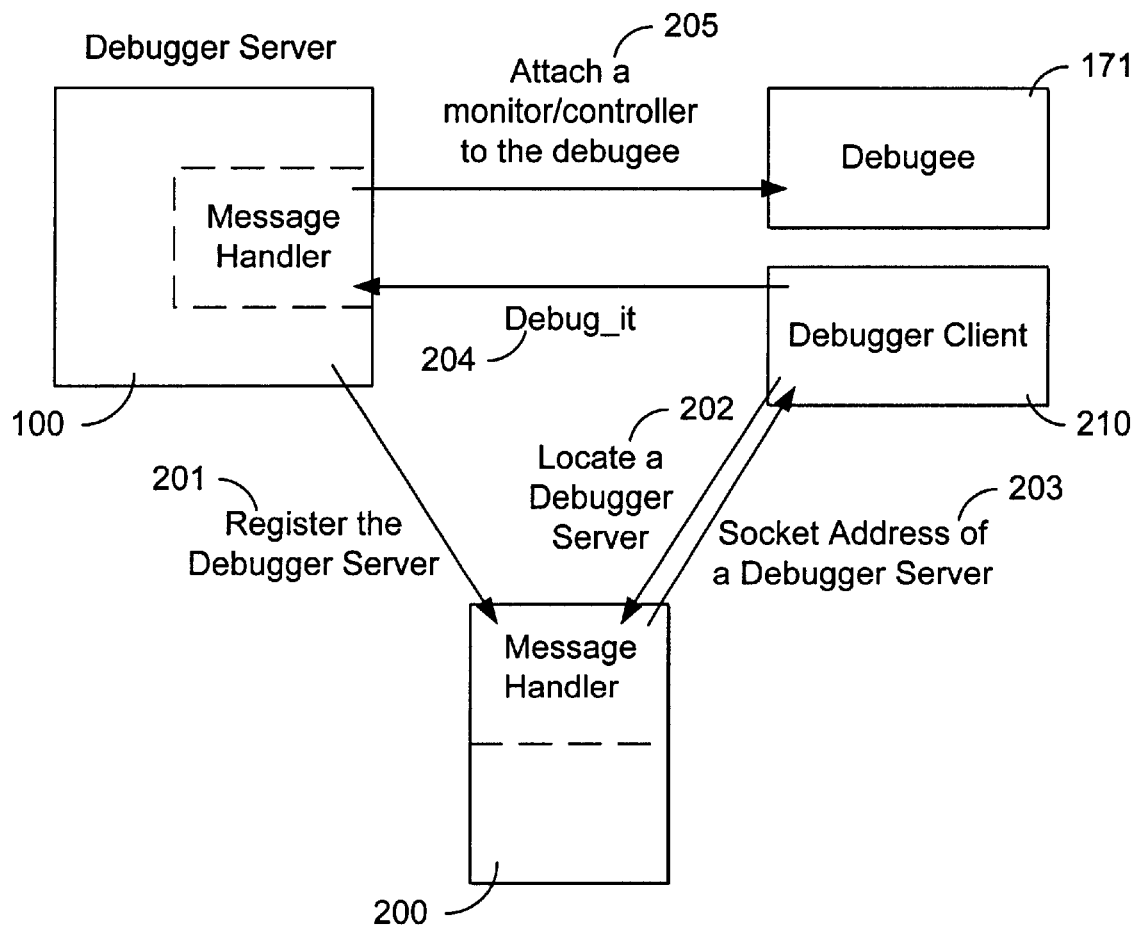
FIG. 10 illustrates a dynamic connection to a debugger in a distributed environment, and more specifically, the steps for the case where a client requests debugging services for another program.

FIG. 10 shows the steps of a debugger client requesting debugging services for another program. When a debugger server 100 is started, it will register itself with the tool locator 200, (message 201, FIG. 10) indicating that it is available to service debugging requests. A debugger client 210, can then send a message 204 to request debugging services for itself or for another program running on the network. It does this by first sending a message 202 to the tool locator to locate a debugger server specified by the debugger client 210. The tool locator 200 will return the socket address of a debugger server that matches the debugger client's specification, message 203. The debugger client 210 then sends a "debugIt" message 204 to the debugger server 100 to request debugging service from the debugger server. The debugger server 100 will then attach a monitor/controller 101 (FIG. 9) to the debugee 171, message 205.

Tool Locator

The tool locator is a general purpose mechanism for locating programs that have certain properties in a distributed environment. An application program (i.e., the debugger client) can call a debugger library routine which will use the tool locator to find a distributed debugger front-end (i.e., the debugger server) which has registered with certain properties such as the user ID its running under, the machine its running on, the X-Windows display its using, the programming languages and operating systems it supports, etc.

When a distributed debugger front-end is started, it can call a debugger library routine to register with the tool locator passing to it a string that contains a list of the form "property-name=property-value" separated by commas. This string is referred to as the "property list". For example, the string:

```
"hostname=atlantic, userid=hpan, opersys=AIX, language=C,
language=CPP"
``` could be used to indicate that the distributed debugger is running on a host named "atlantic" under the user ID "hpan" and that it supports the debugging of programs written in C and C++ on AIX.

The following is the grammar for the property list:

| | |
|---|---|
| property-list : | |
| | one-property \| |
| | one-property , property-list ; |
| one-property : | |
| | property-name = property-value ; |
| property-name : | |
| | string ; |
| property-value : | |
| | string ; |

A "string" is an sequence of alpha-numeric characters and all special characters except "=" and ",".

The application program could then execute the debugMe debugger library routine specifying a search criteria as one of its arguments to indicate that it is looking for any debugger front-end running under the user ID "hpan" that supports C++ on AIX.

The search criteria argument is a string that contains conjunctions and disjunctions of "property-name=property-value" pairs. Parenthesis can be used to specify precedence. There are no predefined property names or property values, they are simply arbitrary sequences of case insensitive alpha-numeric characters.

For example, the string:

```
"userid=hpan and machtype=rs6000 and opersys=AIX and language=C
and language=CPP"
``` could be used to locate any debugger front-end running on any host under the user ID of "hpan" that supports the debugging of C and C++ programs running on a AIX on a RISC System/6000.

For another example, the string:

```
"opersys=WindowNT and language=CPP and machtype=PowerPC and
((userid=hpan and hostname=davinci) or
 (userid=meier and hostname=atlantic) or
 userid=fuh)"
``` could be used to locate any distributed debugger front-end that supports programs written in C++ for Windows NT on a PowerPC that is either running under the user ID of "hpan"

on a host named "davinci" or running under the user ID of "meier" on a host named "atlantic" or running under the user ID of "fuh" on any host.

The tool locator would then return a socket address of the first debugger front-end that matches the criteria to the debugMe routine. If more than one debugger font-end matches the search criteria then their socket address can be retrieved by subsequently executing a series of "FindNext" debugger library calls to the tool locator. The debugMe routine will use the socket address to create a socket connection and send a message to the debugger font-end requesting it to attach a monitor/controller to the process that is running the external program.

The following is the grammar for the search criteria:

```
search-criteria :
        search-and |
        search-criteria OR search-and ;
search-and :
        one-property ]
        search-and AND one-property ;
one-property :
        property-name = property-value ]
        ( search-criteria ) ;
property-name :
        string ;
property-value :
        string ;
```

A "string" is a sequence of alpha-numeric characters and all special characters except "=" and ",". The "AND" operator has higher precedence than the "OR" operator.

Application Program Interface

The tool locator has an application program interface (API) that can logically be broken down into 2 sets of routines. One set of routines is called by a debugger server, and the other set of routines is called by a debugger client. In the preferred embodiment, all communication is done by using internet sockets.

Routines Called By the Debugger Server

| | |
|---|---|
| CREATEREGISTEREDSOCKET | Create a socket and add its socket address to the tool locator registry. |
| CLOSEREGISTEREDSOCKET | Close a socket and delete its socket address from the tool locator registry. |
| STILLALIVE | Inform the tool locator that the debugger server is still available to provide debugging services. |

Routines Called By the Debugger Client

| | |
|---|---|
| BEGINSEARCH | Begin a search of the tool locator registry to locate a debugger server. |
| FINDNEXT | Get the socket address of the next debugger server that matches the given specification. |
| ENDSEARCH | End the search of the tool locator registry. |

Data Types

The following describes a set of data types used by the tool locator.

Socket Address

In this invention a pair of sockets are used for communication between:

The debugger server and the tool locator.
The debugger client and the tool locator.
The debugger client and the debugger server.

Each socket is bound to a socket address. These socket addresses are used by the socket library routines to locate the two end-points of the communication. The following is the C language definition of a socket address.

```
typedef struct {
    unsigned char len;
    unsigned char family;
    unsigned short port;
    unsigned long addr;
} socketaddress_t;
```

Where:

LEN is the length of the socket address (always 6).

FAMILY is the socket family (always AF_INET).

PORT is the port address of the socket.

ADDR is the 32 bit internet address of the machine.

The tool locator of this preferred embodiment supports only the internet type socket address (i.e., family type AF_INET).

Message

Messages are sent via socket communication using the RECVFROM, and SENDTO socket library routines. In a heterogeneous distributed computing environment there will be differences in the way that data is represented on different machine architectures. For example, integers are represented differently on a IBM RISC System/6000 than they are on an IBM PC. To handle these differences EXTERNAL DATA REPRESENTATION (XDR) library routines are used to encode all components of a message before a sendto routine is executed, and to decode the components of a message after the recvfrom routine is executed. The following is the C language definition of a message.

```
typedef struct {
    unsigned char type;
    char data [1000];
} message_t;
```

Where:

| | |
|---|---|
| TYPE | A one byte unsigned integer that represents the message type that is used to identify a particular MESSAGE HANDLER routine. The valid values are: |

1. register
2. unregister
3. still alive
4. begin search
5. find next
6. end search
7. debug it

| DATA | The rest of the message. This is decoded as appropriate by the message handler. |
|---|---|

Tool Locator Registry

The tool locator registry is used and maintained by the tool locator to keep track of all of the registered debugger servers. When a debugger server is registered with the tool locator a structure is allocated and appended to the end of a linked list of structures. The following is the C language definition of a registry item.

```
typedef struct PROPERTYSTRUCT {
    PROPERTYSTRUCT *next;
    char *name;
    char *value;
}
```

Where:

| NEXT | is a pointer to the next property item. |
|---|---|
| NAME | is a character sting which contains the name of the property. |
| VALUE | is a character sting which contains the value of the property. |

```
typedef struct REGISTRYSTRUCT {
    REGISTRYSTRUCT *next;
    REGISTRYSTRUCT *previous;
    PROPERTYSTRUCT *propertylist;
    socketaddress_t sockaddr;
    int interval;
    time_t timestamp;
} registry_t;
```

Where:

| NEXT | is a pointer to the next registry item. |
|---|---|
| PREVIOUS | is a pointer to the previous registry item. |
| PROPERTYLIST | is a pointer to a linked list of properties. |
| SOCKADDR | is socket address of the debugger server. |
| INTERVAL | is frequency in seconds that the debugger server promised to send still alive messages. If 0 then the debugger server will not be sending any still alive messages. |
| TIMESTAMP | is the time that the entry was initialized or the last time a still alive messages was received. |

Search Session List

The search session list is used and maintained by the tool locator to keep track of all of the requests from debugger clients to search the tool locator registry for a debugger server. When a debugger client sends a begin search message, a structure is allocated that represents the search session list item. This item is appended to the end of the search session list. The following is the C language definition of a registry item.

```
typedef struct SESSIONSTRUCT {
    SESSIONSTRUCT *next;
    SESSIONSTRUCT *previous;
    socketaddress_t sockaddr;
    char *searchcriteria;
```

-continued

```
    registry_t *cursor;
} session_t;
```

Where:

| NEXT | is a pointer to the next search session item. |
|---|---|
| PREVIOUS | is a pointer to the previous search session item. |
| SOCKADDR | is a socket address of the debugger client. This socket address is used as the key to the search session list. |
| SEARCHCRITERIA | is a string that contains the search criteria that was specified as an argument of the call to the BeginSearch routine. |
| CURSOR | is a pointer to the registry item that was found as a result of the most recent call to the FindNext routine. |

Tool Locator API Routines

The following describes a set of Application Program Interface (API) routines provided by the tool locator. These API routines will be called by debugger servers and debugger clients.

RegisterTool Routine

Register a tool and an associated property list with the tool locator and return a connectionless internet family socket.

The caller must supply a property list. The routine will return a connectionless internet family socket to the caller (i.e., the debugger server) which will be used to communicate with any of its debugger clients or the tool locator using the recvfrom and sendto socket library routines.

```
void RegisterTool (char *propertylist,
                   int interval,
                   int *dbgserversocket,
                   int *status) ;
``` where:

| PROPERTYLIST | A string that contains a property list. |
|---|---|
| INTERVAL | The debugger server promises to send a still alive message to the tool locator every interval seconds. If the tool locator stops receiving still alive messages from the debugger server, it can free up its entry in the tool locator registry. A value of 0 means that the debugger server will not be sending any still alive messages and therefore the tool locator should keep its tool locator registry entry until it receives an unregister message. |
| DBGSERVERSOCKET | A pointer to a variable of type int where a socket is returned that can be used by the debugger server to communicate with any of its debugger clients. |
| STATUS | A pointer to an int where the status code is returned. The values returned will be one of: |
| ERROR_STATUS_OK | normal completion |
| NO_TOOL_LOCATOR_HOST | The environment variable TOOLLOCATORHOST is not set. |
| TOOL_LOCATOR_NOT_RESPONDING | The tool locator is not responding. |

StillAlive Routine

Inform the tool locator that the debugger server is still available. Its C declaration is:

```
void StillAlive( int dbgserversocket,
                 int *status) ;
``` where:

| | |
|---|---|
| DBGSERVERSOCKET | The socket that was returned by the call to RegisterTool. This socket is used by the debugger server to communicate with its debugger clients and the tool locator. |
| STATUS | a pointer to an int where the status code is returned. The values returned will be one of: |
| ERROR_STATUS_OK | normal completion |
| NO_TOOL_LOCATOR_HOST | The environment variable TOOLLOCATORHOST is not set. |
| TOOL_LOCATOR_NOT_RESPONDING | The tool locator is not responding. |
| INVALID_SOCKET | The specified socket is not valid. |

UnregisterTool Routine

Close a socket that was created by RegisterTool and remove it from the tool locator registry. Its C declaration is:

```
void UnregisterTool( int dbgserversocket,
                     int *status) ;
``` where:

| | |
|---|---|
| DBGSERVERSOCKET | The socket that was returned by the call to CreateRegisteredSocket. This socket is used by the debugger server to communicate with its debugger client and the tool locator. |
| STATUS | a pointer to an int where the status code is returned. The values returned will be one of: |
| ERROR_STATUS_OK | normal completion |
| NO_TOOL_LOCATOR_HOST | The environment variable TOOLLOCATORHOST is not set. |
| TOOL_LOCATOR_NOT_RESPONDING | The tool locator is not responding. |
| INVALID_SOCKET | The specified socket is not valid. |

BeginSearch Routine

Begin a search of the tool locator registry to locate a debugger server. A search criteria can be specified.

To search the tool locator registry the debugger client executes a call to BeginSearch specifying a search criteria. The debugger client will then make one or more calls to FindNext. Each call will return the socket address of a debugger server that matches the search criteria specified on the BeginSearch call. Once a suitable debugger server is found, a call to EndSearch is made to end the search.

The BeginSearch routine will create a connectionless internet socket and return it to the caller (i.e., the debugger client). This socket is used to communicate with the tool locator and must be passed on all subsequent calls to FindNext and EndSearch. The EndSearch routine will close the socket. The C declaration for this routine is:

```
void BeginSearch(char *searchcriteria,
                 int dbgclientsocket,
                 int *status) ;
``` where:

| | |
|---|---|
| SEARCHCRITERIA | A string that contains a search criteria. |
| DBGCLIENTSOCKET | A pointer to a variable of type int where a socket is returned that can be used by the debugger client to communicate with the tool locator. |
| STATUS | a pointer to an int where the status code is returned. The values returned will be one of: |
| ERROR_STATUS_OK | normal completion |
| NO_TOOL_LOCATOR_HOST | The environment variable TOOLLOCATORHOST is not set. |
| TOOL_LOCATOR_NOT_RESPONDING | The tool locator is not responding. |

FindNext Routine

Find the next debugger server and return a socket address that can be used to communicate with that server. The C declaration for this routine is:

```
void FindNext(int dbgclientsocket,
              socketaddress_t *dbgserversockaddr,
              int *status) ;
``` where:

| | |
|---|---|
| DBGCLIENTSOCKET | The socket that was returned by the call to BeginSearch. This socket is used by the debugger client to communicate with the tool locator. |
| DBCSERVERSOCKADDR | A pointer to a variable of type socketaddress_t where the socket address is returned that the debugger client can use to communicate with the debugger server. |
| STATUS | a pointer to an int where the status code is returned. The values returned will be one of: |
| ERROR_STATUS_OK | normal completion |
| NO_MORE | No more debugger servers can be found. |
| NO_BEGIN_SEARCH | A call to BeginSearch must be made before calling FindNext. |
| NO_TOOL_LOCATOR_HOST | The environment variable TOOLLOCATORHOST is not set. |
| TOOL_LOCATOR_NOT_RESPONDING | The tool locator is not responding. |

EndSearch Routine

End the search of the tool locator registry and close the socket that was created by the BeginSearch routine. The C declaration for this routine is:

```
void EndSearch(int dbgclientsocket,
               int *status) ;
``` where:

| | |
|---|---|
| DBGCLIENTSOCKET | The socket that was returned by the call to BeginSearch. This socket is used by the debugger client to communicate with the tool locator. |
| STATUS | a pointer to an int where the status code is returned. The values returned will be one of: |
| ERROR_STATUS_OK | normal completion |
| NO_TOOL_LOCATOR_HOST | The environment variable TOOLLOCATORHOST is not set. |
| TOOL_LOCATOR_NOT_RESPONDING | The tool locator is not responding. |
| NO_BEGIN_SEARCH | A call to BeginSearch must be made before calling EndSearch. |

Tool Locator Message Handler Routines

These routines handle messages that are received from various debugger clients and debugger servers via a connectionless internet socket that is bound to the well known port address of the tool locator.

The recvfrom and sendto socket library routines are used to communicate with the debugger clients and debugger servers. The recvfrom will read both a message and the socket address of the debugger client or debugger server that sent the message. This socket address is used to send response back via the sendto routine and to uniquely identify a session between the tool locator and a debugger client or debugger server.

Register Message Handler Routine

The register message contains a property list and the frequency, in number of seconds, that the debugger server promises to send still alive messages. The socket address of a debugger server is returned by the recvfrom socket library routine call. An item is appended to the end of the tool locator registry which includes the property list, the debugger server socket address, and the frequency that still alive messages will be sent by the debugger server.

Still Alive Message Handler Routine

The still alive message contains a socket address which is used to locate the tool locator registry entry for the debugger server. A time-stamp in this entry is updated to indicate the last time the tool locator heard from the debugger server. If the tool locator doesn't receive a still alive message from a debugger server after a certain number of seconds that was specified when the debugger server was registered, then its entry will be removed from the tool locator registry.

Unregister Message Handler Routine

The unregister message contains a socket address which is used to delete the tool locator registry entry for the debugger server. Before the tool locator registry entry is deleted, all of the items in the search session list are examined to determine if the current cursor points to the registry entry that will be deleted. If it does, then the current cursor is set to the previous tool locator registry entry. If there is no previous entry, (i.e. we are deleting the first entry in the tool locator registry), then the current cursor is set to NULL.

Begin Search Message Handler Routine

The begin search message contains a search criteria. The socket address of a debugger client is returned by the recvfrom socket library routine call. An item is added to a search session list which is keyed by the socket address of the debugger client. The new search session item will contain information such as the search criteria and the current cursor position in tool locator registry (see "Search Session List").

Find Next Message Handler Routine

The find next message does not contain any data. The socket address of a debugger client is returned by the recvfrom socket library routine call.

The socket address of the debugger client is used to locate a search session list item that was created by the begin search message handler. The item contains the current cursor position in the tool locator registry. The first time a find next message is received, the cursor position will be at the beginning of the tool locator registry. A search of the tool locator registry is done using the search criteria specified in the begin search message from the debugger client. The search criteria is applied to each of the property lists stored in the tool locator registry entries. These property lists were previously supplied by the various debugger servers when they registered with the tool locator.

When a match occurs, the socket address of the debugger server from the tool locator registry is written back to the debugger client. The current cursor position in the search session list item is updated to point to the matched tool locator registry item.

End Search Message Handler Routine

The end search message does not contain any data. The socket address of a debugger client is returned by the recvfrom socket library routine call.

The socket address of the debugger client is used to delete the entry from the search session list.

Tool Locator Control Flow

Figure 11:
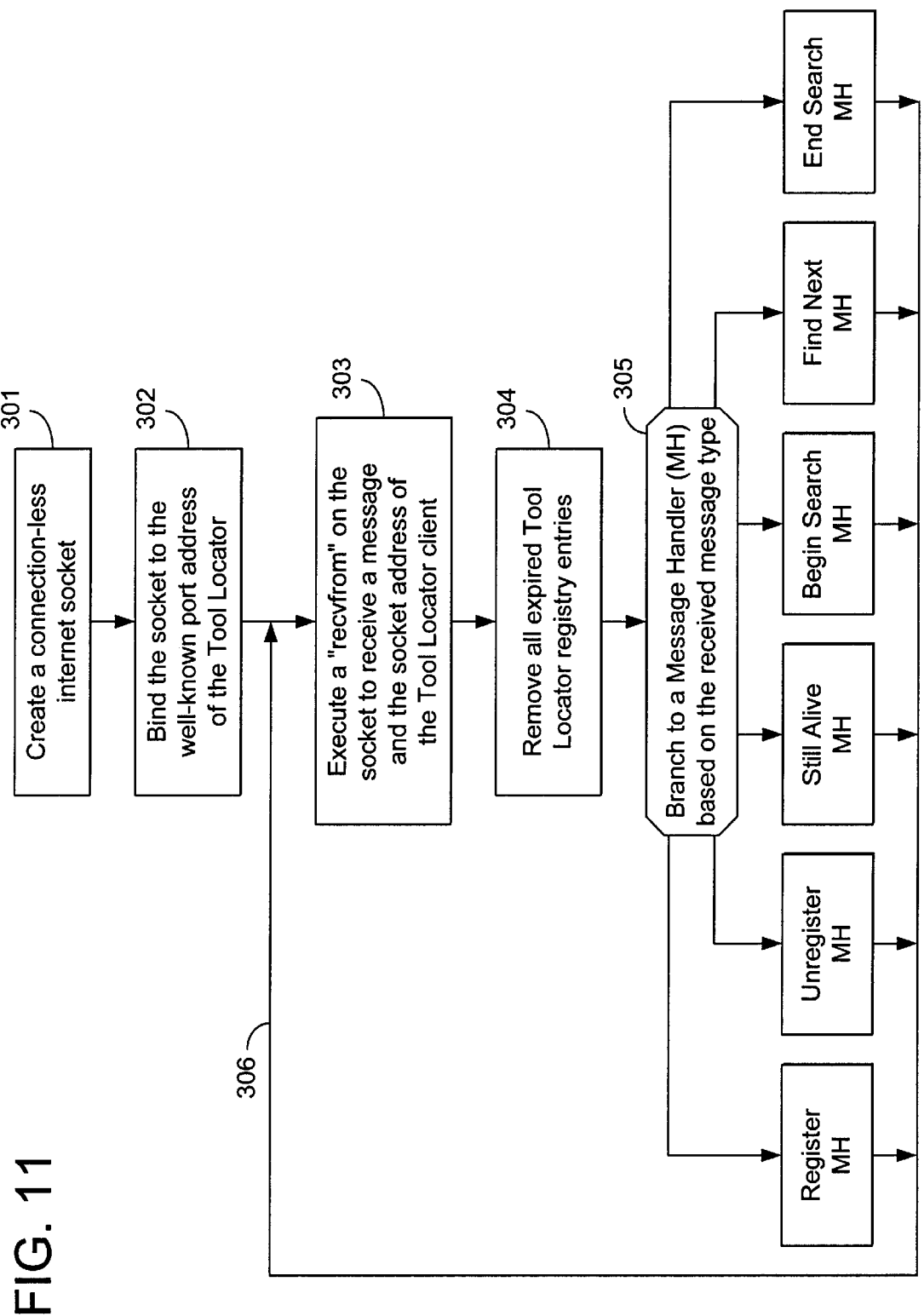
FIG. 11 illustrates the tool locator control flow.

A daemon process is needed for the tool locator and is invoked according to the following steps as shown in FIG. 11, which illustrates the control flow of a tool mapper daemon.

Step 301: Create a connectionless internet socket.
Step 302: Bind the socket to the well-known port address of the tool locator.
Step 303: Execute a recvfrom on the socket to receive a message and the socket address of the tool locator client.
Step 304: Remove all expired tool locator registry entries.
Step 305: Call a message handler routine based on the received message type.
Step 306: Go to 303.

Debugger

Debugger Client Application Program Interface

Debugger clients will call the following two application program interfaces (API) routines provided by the debugger library to request debugging services.

Debugit Routine

A call to the debugIt routine is made passing a search criteria which is used to locate a debugger server. The arguments to the debugIt routine include all of the information necessary for that debugger server to locate a particular application program and attach a monitor/controller to it.

```
void debugIt(char *searchcriteria,
             char *inetaddr,
             char *userid,
             char *password,
```

-continued

```
int addrspaceid,
int threadid,
unsigned int instraddr;
char *dbgservargs,
int *status) ;
``` where:

| | |
|---|---|
| SEARCHCRITERIA | A string that contains the search criteria described above. If NULL is specified, then the current value of the DEBUGSEARCHCRITERIA environment variable will be used. |
| INETADDR | The internet address of the machine where the debugee is running. |
| USERID | The user ID that the debugee is running under. |
| PASSWORD | The password of the user ID that the debugee is running under. |
| ADDRSPACEID | The address-space ID (i.e., UNIX process ID) that the debugee is running under. |
| THREADID | The thread ID that the debugee is running under. |
| INSTRADDR | The instruction address where the debugging session should begin. If zero is specified then the current instruction address of the debugee is used. |
| DBGSERVARGS | is a string that can contain arguments for the debugger (e.g. where to find source code). |
| STATUS | a pointer to an int where the status code is returned. The values returned will be one of: |
| ERROR_STATUS_OK | normal completion |
| DBG_NO_DEBUGGER_SERVER_FOUND | No debugger server found that matches the specified search criteria |
| DBG_DEBUGGER_SERVER_REJECT rejected the request for | The debugger server has debugging services. |

Figure 12:
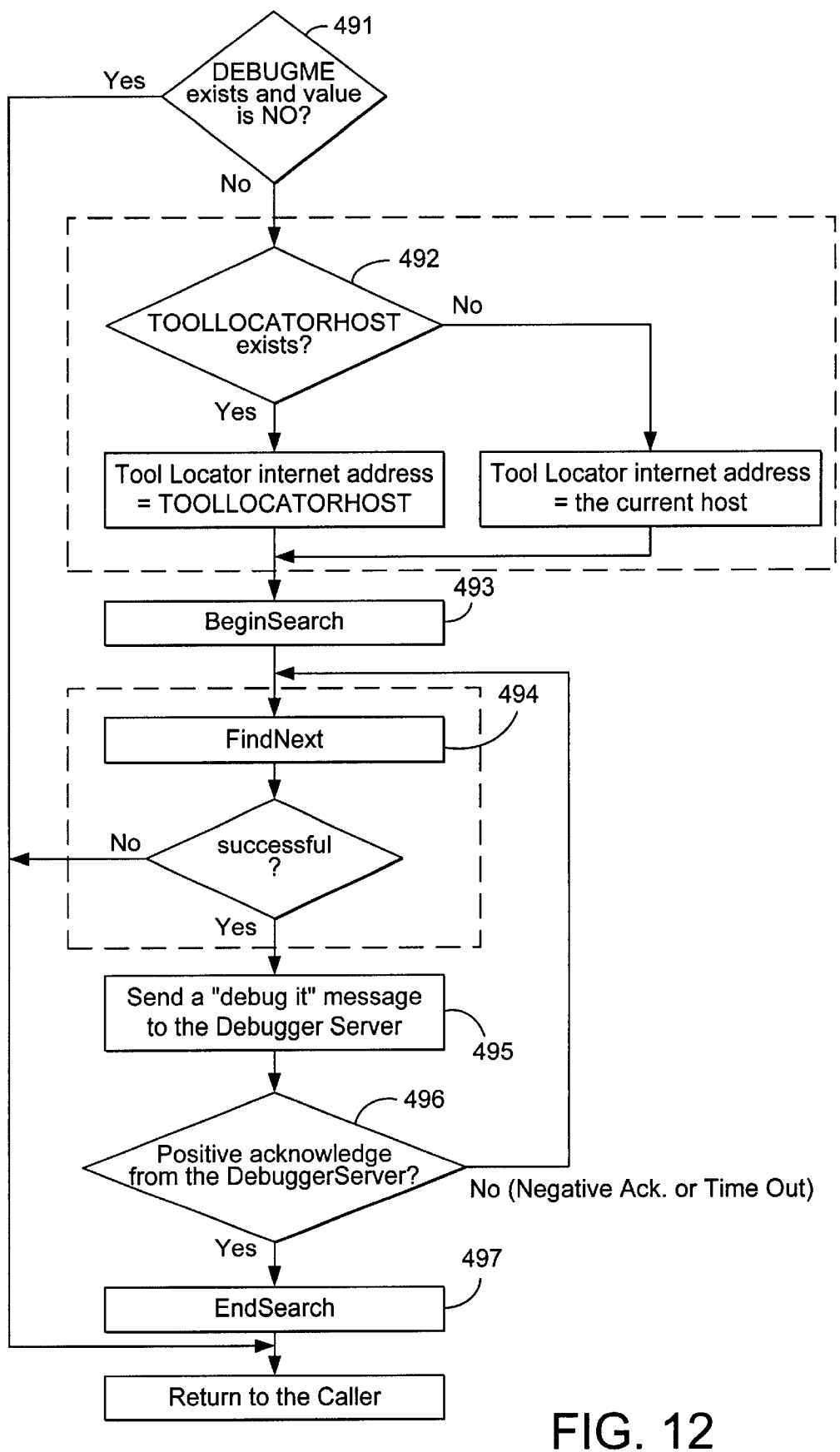
FIG. 12 illustrates the control flow of the client debugIt Routine.

For example:

```
debugIt("hostname=davinci and userid=hpan and language=CPP",
        "thistle.stl.ibm.com", "meier", "mypasswd", 35647, 1, 0,
        "-s/u/hpan/code -s /u/hpan/src", &status) ;
``` will cause the following to occur (refer to FIG. 12):

Step 491: Look for an environment variable named DEBUGME. If found and value is NO return to caller. Otherwise continue with next step.

Step 492: Look for an environment variable named TOOLLOCATORHOST that specifies the internet address of the tool locator. If the TOOLLOCATORHOST environment variable is not defined then the internet address of the current host is used.

Step 493: Execute a BeginSearch routine passing the search criteria. The BeginSearch routine will return a connectionless internet socket that is used to communicate with both the tool locator and the debugger server.

Step 494: Execute a FindNext routine which, if successful, returns the socket address of the corresponding debugger server. If there is a failure then return to the caller passing back the error status.

Step 495: Send a debug it message to the debugger server that includes all of the arguments of the debugIt routine such as internet address, login ID, password, address-space ID, thread ID, instruction address and the debugger server arguments.

The message is sent to the debugger server by executing a call to the sendto socket library routine passing the socket returned by the BeginSearch routine and the debugger server socket address returned by the FindNext routine as arguments of the sendto call.

NOTE: This is an optimization to avoid creating a new socket just to send the one debug it message.

Step 496: Receive from the debugger server an acknowledgement message. If a negative acknowledgement is received or a timeout occurs then repeat the previous two steps until a status of no_more is returned from the call to FindNext.

Step 497: Execute a EndSearch to end the search session and close the socket.

DebugMe Routine

A call to the debugMe routine is made passing a search criteria which is used to locate a debugger server. In this case the debugee is the program that is currently running the debugMe routine. The debugMe routine calls the debugIt routine passing the specified search criteria along with the current internet address, login ID, password, address-space ID, thread ID, and an instruction address which is the return address of the debugMe call.

```
void debugMe(char *searchcriteria,
             char *dbgservargs,
             int *status) ;
``` where:

SEARCHCRITERIA A string that contains the search criteria described above. If NULL is specified, then the current value of the DEBUGSEARCHCRITERIA environment variable will be used.

| | |
|---|---|
| DBGSERVARGS | is a string that can contain arguments for the debugger (e.g. where to find source code). |
| STATUS | is a pointer to an int where the status code is returned. The values returned will be one of: |
| ERROR_STATUS_OK | normal completion |
| DBG_NO_DEBUGGER_SERVER_FOUND | No debugger server found that matches the specified search criteria. |
| DBG_TOOL_LOCATOR_FAILURE | A call to the tool locator failed. |
| DBG_NO_TOOL_LOCATOR_FOUND | No tool locator found. |

For example:

```
debugMe("hostname=davinci and userid=hpan and language=CPP",
        "-s /u/hpan/code", &status) ;
``` will cause the debugIt routine to be called passing the current internet address, login ID, password, address-space ID, thread ID, and the return address of the debugMe routine. The string "-s /u/hpan/code" will be used by the debugger server to locate the source code.

Debugger Server Message Handler Routine

This routine handles messages that are received from various debugger clients via a connectionless internet socket that is created by the RegisterTool routine.

The recvfrom and sendto socket library routines are used to communicate with the debugger clients. The recvfrom will read both a message and the socket address of the debugger client that sent the message. This socket address is used to send the response back to the debugger client via the sendto routine.

Debug It Message Handler Routine

The debug it message contains the internet address, login ID, password, address-space ID, thread ID, instruction address of a debugee, and a debugger server argument string. The socket address of a debugger client is returned by the recvfrom socket library routine call.

If this is the first debug it message for the debugee, then the debugger server will parse the debugger server arguments string to set various debugger options, such as where to locate the source code, and then "attach" a monitor/controller to the debugee.

A breakpoint is set at the instruction address specified in the message and an acknowledgement message is sent back to the debugger client.

Implementation of The Dynamic Connection Mechanism

The following describes implementations of this dynamic connection invention to debug client/server application programs based on DB2/6000 and CICS/6000. In these two implementations, three ways are shown in which a debugee can be attached by a debugger server; 1) the debugee is started under the debugger server; 2) a third program referred to as a debugger client issues a "debugIt" request specifying a debugee; 3) the debugee issues a "debugMe" request. In the third case, the debugee is also the debugger client.

Debugging DB2/6000 Client/Server Application

Figure 13:
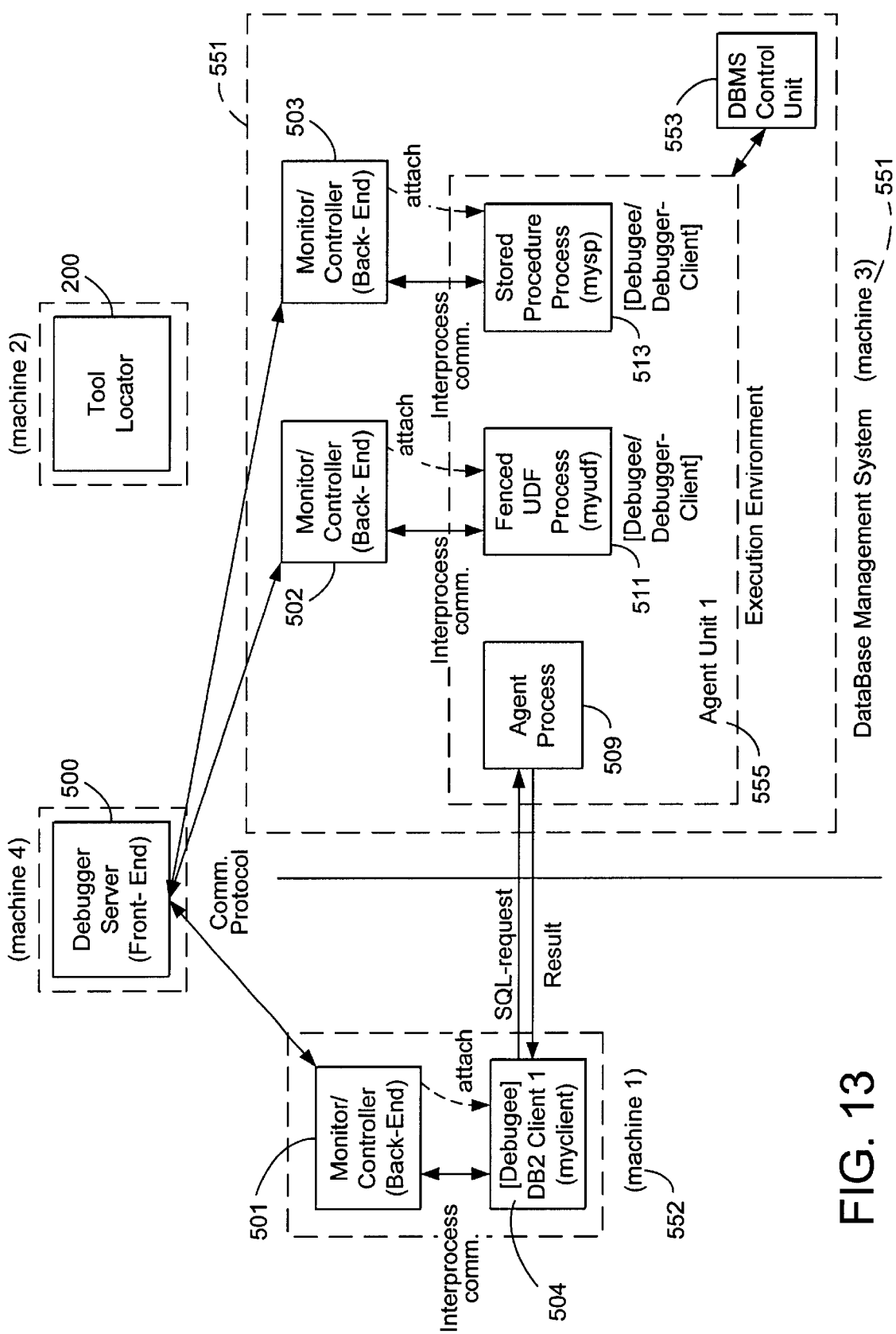
FIG. 13 illustrates a debugging environment of a DB2/6000 application.

FIG. 13 shows a parallel and distributed debugger 500, 501, 502, 503, monitoring and controlling a DB2/6000 application program. A client program "myclient" 504 is running in a process on machine 1, 552. DB2/6000 external programs (i.e., stored procedure 513 and user defined functions 511) are executed under the control of DB2/6000 system on machine 3, 551.

The DB2/6000 system is a set of control processes, represented by the DBMS Control Unit box 553, created at database instance creation time. The control unit 553 listens for "connection" requests from clients 504. For each connection request, the control unit 553 spawns a new set of processes which is referred to as agent unit 505. The newly created agent unit is then connected to the corresponding client for receiving and serving the subsequent database requests. The agent unit consists of an agent process 509 and, optionally, a set of fenced UDF processes 511, and/or a set of stored procedure processes 513.

The agent process 509 runs the major part of the database engine code and is, therefore, also referred to as the "database engine". The agent process 509 takes the request from the client and distributes the request to various service components of the database engine to accomplish the requested action. Besides the database engine code, the agent process also runs un-fenced UDF code.

A fenced UDF process 511 runs the run-time code which communicates with the agent process, dynamically loads the UDF library, and runs fenced UDF code. The number of fenced UDF processes varies from one implementation to another. For example, there could be one fenced UDF process shared by all the fenced UDFs invoked in a current application or there could be more than one such processes, each serves a set of fenced UDFs that are run under the same user ID.

In many aspects, a stored procedure process 513 has the same run-time characteristics as that of a fenced UDF process. Unlike fenced UDF process 511, a stored procedure process 513 runs the external program as if it were a stand alone application sitting on the server machine. In general, there could be more than one stored procedure process 513 associated with a client program.

In this example, the client program "myclient" 514 executes a stored procedure named "mysp" 513. The store procedure then executes a SQL SELECT command that contains a call to a fenced UDF named "myudf" 511. The database server loads the stored procedure (mysp) 513 and the fenced UDF (myudf) 511 in their own separate process on the same machine that the DBMS is running (i.e., machine 3), 551. A separate monitor/controller (debugger back-end), 501, 502, 503 will be "attached" to each of the processes that are running the client program, stored procedure, and user defined function using the "dynamic connection" mechanism.

Just before the external program is about to be executed in a stored procedure or fenced UDF process, a library routine is called to do the following two steps. First, the process checks to see if a monitor/controller is already attached to the current process. If not, the process will execute a debugMe library routine as illustrated in FIG. 2, to locate a debugger server and to obtain the socket address of the debugger server through the tool locator. The debugMe routine will then send a message to the debugger server to have it attach a monitor/controller to the current process (i.e., the debugee). Second, the process calls a particular library routine that executes a breakpoint which tells the debugger that an external program is about to be executed. The debugger will then run the current process to the first executable statement of the external program and execute a breakpoint. The application programmer is then able to debug the program by using the various debugger commands (e.g., line step, call step, display/modify variables, set breakpoints etc.)

After the external program returns, the current process calls a particular library routine that executes a breakpoint to notify the debugger about the ending of the external program. If the stored procedure or fenced UDF process can be shared between users (i.e., DB2 client/server connections), the debugger will detach the monitor/controller from the process that ran the external program. If it cannot be shared between users, the debugger can leave the monitor/controller attached for better efficiency. This is particularly useful for UDFs which will generally be called many times for each SQL SELECT statement.

In the above example, the stored procedure process and fenced UDF process play the role of both debugger client and debugee.

Debugging Distributed CICS Application

Figure 14:
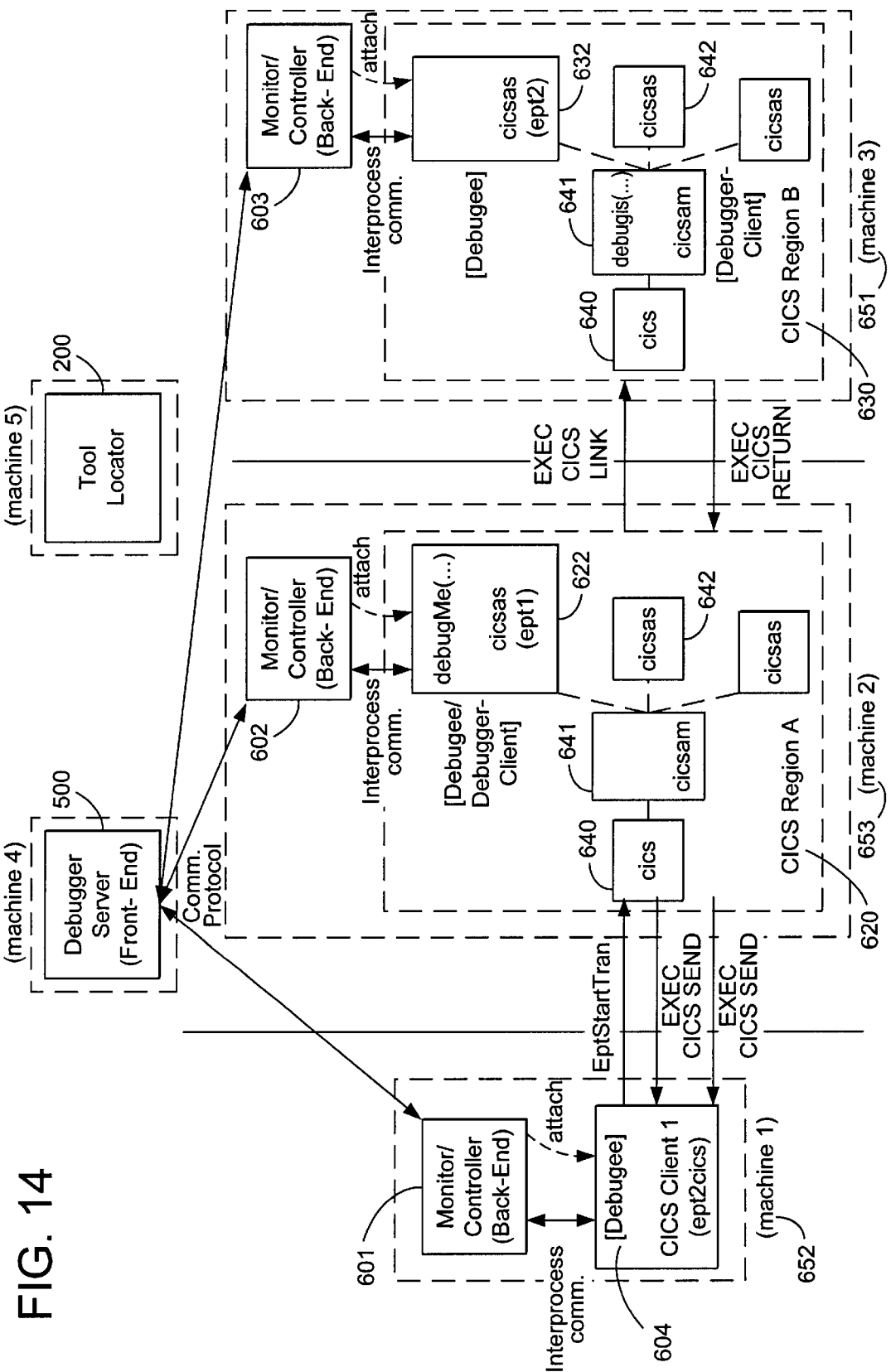
FIG. 14 illustrates a debugging environment of a CICS/6000 application.

FIG. 14 illustrates the environment of debugging a distributed CICS/6000 sample application. Each CICS/6000 region, 620, 630, consists of many UNIX processes. The CICS/6000 implementation includes the following system processes. The "cics" process 640 is a CICS/6000 root process that is created at initialization. This process starts (spawns) other processes including "cicsam" 641. The "cicsam" is a CICS/6000 application monitor and is responsible for managing CICS application servers (i.e., "cicsas") 642. Each "cicsas" process 622 is a CICS/6000 application server where the individual CICS transaction programs are run.

This example of a distributed CICS application has a client program "epi2cics" 604, which is running on machine 1, 652, that uses the External Presentation Interface (EPI) to invoke the transaction "ept1," 622, in Region A, which is running on machine 2, 653. The "ept1" transaction program, in turn, uses the "EXEC CICS LINK" call to invoke a second transaction named "ept2," 632, in Region B, 630, which is running on machine 3, 651.

After the client program "epi2cics" invokes the "ept1" transaction, the CICS application monitor (cicsam) 641 for Region A 620 allocates an available application server (cicsas). The "cicsas" then arranges to have the application server dynamically load the associate transaction program and calls the UNIX system "sleep" routine (with a very large time value) right before it is about to execute the transaction program. Next, the application server (cicsas) 622 will invoke the debugMe library routine to locate a debugger server 600 (which is running on machine 4) and to obtain its socket address using the tool locator 200, also running on different machine, machine 5. The debugMe routine uses the socket address to send a "debug me" message to the debugger server (i.e., the debugger front-end) requesting service. The debugger server, in turn, attaches a monitor/controller 602 to the CICS application server (cicsas) process 622 that will run the transaction program. Once the monitor/controller 602 is attached to the application server process 622, the debugger will send the application server process a UNIX signal to wake it out of its sleep. The debugger will then run the application server to the first executable statement of the transaction program and execute a breakpoint. The application programmer is then able to debug the program by using the various debugger commands (e.g., line step, call step, display/modify variables, set breakpoints etc.)

The "ept1" transaction program 622 will eventually execute the "EXEC CICS LINK" command to invoke the "ept2" transaction 632 in Region B 630. The following steps will have the debugger server attach a monitor/controller to the application server process that runs the associated transaction program in Region B. The CICS application monitor (cicsam) 641 in Region B 630, will invoke the debugIt library routine to locate a debugger server 600 (which is running on machine 4) and to obtain its socket address using the tool locator 200, also running on different machine, machine 5. The debugIt routine uses the socket address to send a "debug it" message to the debugger server (i.e., the debugger front-end) requesting service. The debugger server, in turn, attaches a monitor/controller 603 to the CICS application server (cicsas) process 632 that will run the transaction program. Once the monitor/controller is attached to the application server process, the debugger will send the application server process a UNIX signal to wake it out of its sleep. The debugger will then run the application server to the first executable statement of the transaction program and execute a breakpoint. The application programmer is then able to debug the program by using the various debugger commands (e.g., line step, call step, display/modify variables, set breakpoints etc.)

After the "ept2" transaction completes, the CICS application server calls a particular library routine that executes a breakpoint to signal the debugger about the completion of the transaction program. The debugger then detaches the monitor/controller from the application server process and allows it to continue its execution.

Using the foregoing specification, the invention may be implemented using standard programming and/or engineering techniques using computer programming software, firmware, hardware or any combination or subcombination thereof. Any such resulting program(s), having computer readable program code means, may be embodied within one or more computer usable media such as fixed (hard) drives, disk, diskettes, optical disks, magnetic tape, semiconductor memories such as ROM, Proms, etc., or any memory, transmitting, or other device, thereby making a computer program product, i.e., an article of manufacture, according to the invention. The article of manufacture containing the computer programming code may be made and/or used by executing the code directly from one or more media, by copying the code from one medium to another medium, or by transmitting the code over a network.

An apparatus for making, using, or selling the invention may be one or more processing systems including, but not limited to, cpu, memory, storage devices, communication links, communication devices, servers, I/O devices, or any subcomponents or individual parts of one or more processing systems, including software, firmware, hardware or any combination or subcombination thereof, which embody the invention as set forth in the claims.

User input may be received from the keyboard, mouse, pen, voice, touch screen, or any other means by which a human can input data to a computer, including through other programs such as application programs.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, although the foregoing specification described the dynamic connection invention based on a socket mechanism that is supported across many operating systems (e.g., AIX, OS/2, and MVS), the invention could be implemented using other address locating mechanisms supported by other operating systems. In addition, although the invention has been described with reference to a CICS/6000 implementation, the invention is applicable to other transaction monitoring systems, database management systems, message queuing systems, and other software systems. In addition, although the invention has been described with reference to distributed applications running in a distributed environment, the invention is applicable to application programs running on a single machine.

A method, system and program product have been shown above for locating application development tools (e.g. debuggers) within a network of processing systems comprising the steps of or means for: receiving, from a tool, a registration of the tool, when the tool is started on any machine within the network, indicating certain properties of the tool; maintaining a list of tools for which the registration of the tools has been received; receiving, from an application program, criteria for a desired tool; and returning, to the application program, at least one located tool meeting the criteria and a communication endpoint address that can be used to establish a dynamic connection with the located tool.

A system, method, and program product have been shown above for using an application development tool (e.g. a debugger) in conjunction with an application program where the application development tool (tool) and the application program may be running on different machines within a network of processing systems comprising the steps of or means for: sending, by the application program, to a tool locator, a criteria of a desired tool; receiving, from the tool locator, a communication endpoint address that can be used to establish a connection to the tool meeting the criteria of the desired tool; and sending, by the application program, using the received communication endpoint address, a tool request message for the tool. The above steps and means are also applicable for debugging a debugee residing on a first machine in a network of processing systems wherein a debugger may reside on a second machine in the network of processing systems.

Furthermore, the above describes a method for debugging at least one DBMS external program in a network of processing systems comprising: initiating an execution, by a client program running on a first machine in the network, of the at least one DBMS external program; loading, by a DBMS running on a second machine, each of the at least one external program in a separate process; prior to executing the at least one external program, calling a library routine, by the DBMS, to verify whether a debugger back-end is attached to the separate process, and if not, performing the following steps: (i) invoking a routine, by the DBMS, to obtain a communication endpoint address of a debugger through a tool locator; (ii) establishing a connection to the debugger using the communication endpoint address; (iii) sending the debugger, using the established connection, a debugging request to attach a back-end of the debugger to at least one of each of the separate process running each of the at least one DBMS external program; and running the at least one separate process, under the control of the debugger, to an executable statement of the DBMS external program, and executing a breakpoint to allow the DBMS external program to be debugged by using debugging commands of the debugger.

Also, described is a method for debugging at least one transaction program in a network of processing systems, the method comprising: invoking the at least one transaction program, by a client program running on a first machine in the network; allocating, by a transaction monitor running on a second machine, a separate process to load each of the at least one transaction program; prior to executing the transaction program, calling a library routine, by the transaction monitor, to verify whether a debugger back-end is attached to the separate process, and if not, performing the following steps: (i) invoking a routine, by the transaction monitor, to obtain a communication endpoint address of a debugger through a tool locator; (ii) establishing a connection to the debugger using the communication endpoint address; (iii) sending the debugger, using the established connection, a debugging request to attach a back-end of the debugger to the separate process running the transaction program; and running the at least one separate process, under the control of the debugger, to an executable statement of the transaction program, and executing a breakpoint to allow the transaction program to be debugged by using debugging commands of the debugger.

In addition, described is a method for debugging a message queuing program in a network of processing systems, the method comprising: queuing a message, by a client program running on a first machine in the network, to a queue on a second machine; allocating, by a message queuing system running on a second machine, a separate process to load a message server program; prior to executing the message server program, calling a library routine, by the message queuing system, to verify whether a debugger back-end is attached to the separate process, and if not, performing the following steps: (i) invoking a routine, by the message queuing system, to obtain a communication endpoint address of a debugger through a tool locator; (ii) establishing a connection to the debugger using the communication endpoint address; (iii) sending the debugger, using the established connection, a debugging request to attach a back-end of the debugger to the separate process running the message server program; and running the separate process, under the control of the debugger, to an executable statement of the message server program, and executing a breakpoint to allow the message server program to be debugged by using debugging commands of the debugger.

Also, described is a method for debugging an object method of a distributed object in a network of processing systems, the method comprising: invoking the object method of the distributed object, by a client program running on a first machine in the network; allocating, by a distributed object system running on a second machine, a separate process to load a program that contains the object method of the distributed object; prior to executing the object method of the distributed object, calling a library routine, by the distributed object system, to verify whether a debugger back-end is attached to the separate process, and if not, performing the following steps: (i) invoking a routine, by the distributed object system, to obtain a communication endpoint address of a debugger through a tool locator; (ii) establishing a connection to the debugger using the communication endpoint address; (iii) sending the debugger, using the established connection, a debugging request to attach a back- end of the debugger to the separate process running the object method of the distributed object; and running the object method of the distributed object, under the control of the debugger, to an executable statement of the object method of the distributed object, and executing a breakpoint to allow the object method of the distributed object to be debugged by using debugging commands of the debugger.

Additionally, the above describes a method for debugging an application program in a network of processing systems, the method comprising: calling a library routine, by the application program, to verify whether a debugger back-end is attached to a process running the application program, and if not, performing the following steps: (i) invoking a routine, by the application program, to obtain a communication endpoint address of a debugger through a tool locator; (ii) establishing a connection to the debugger using the communication endpoint address; and (iii) sending the debugger, using the established connection, a debugging request to attach a back-end of the debugger to the process running the application program.

More broadly, the above discloses a system and method, in a network of processing systems, for debugging an application program, comprising the steps of or means for: enabling an application program, running on a first machine within the network of processing systems, to locate, at run time, a distributed debugger front-end running on a different machine; and sending, from the application to the located debugger front-end, a message requesting debugging services.

The above described invention provides a dynamic connection for distributed applications that need to locate application development tools, (including but not limited to debuggers, trace collection tools, compilers, etc.) which may be running on different machines, and to send the tools messages. The invention is applicable to external programs in a relational database system (RDBMS), other database systems (DBMS), distributed objects, transaction monitoring systems, message queuing systems, and other software systems. The preferred embodiment illustrates debugging application programs which are executed under the control of a software system such as a database management system (e.g. DB2/6000), or a transaction monitoring system (e.g., CICS/6000). More, specifically, the invention provides an application program initiated approach to debugging, in which either 1) an application program requests debugging services from a debugger, or 2) a software system requests debugging services on behalf of an application program. In either case, the program requesting debugging service (i.e., a debugger client) sends, to a tool locator, criteria which specifies the properties of a desired debugger. The tool locator maintains a registry of all tools, e.g. debuggers, and their properties, which remain active within the network by receiving tool registration information from each tool as it is started on any machine within the network. When a message is received by the tool locator from a debugger client specifying the criteria of a desired debugger, the tool locator searches its registry and returns a list of debuggers matching the specified properties along with a communication endpoint address that can be used to establish a connection with a debugger meeting the criteria. The debugger client then sends a message, using the established connection, to the desired debugger requesting debugging services on behalf of the debugger client or another program. As a result, a dynamic connection is made, at run time, between an application program and a debugger having certain desired properties wherein the debugger may be active, if at all, at any time on any machine within the network.

Description of a Method and System for Debugging Parallel and Distributed Applications Background The prior art for parallel and distributed debuggers is illustrated by serial debuggers and parallel and distributed debuggers. Serial debuggers are incapable of effectively debugging parallel and distributed applications (e.g., client/server, peer-to-peer, etc.). Parallel and distributed debuggers generally have required a complete instantiation of the debugger for every program that makes up the distributed application on each machine where the distributed application is running, thus yielding multiple debuggers and multiple user interfaces.

In view of the above, there is a need for a method of, and system for, debugging parallel and distributed applications having multiple programs with many threads of execution running on various machines on a variety of operating systems, from a single user interface.

Summary

One of the major inhibitors to developing parallel and distributed applications (e.g. client/server, peer-to-peer) is the lack of good debugging tools. To debug a parallel and distributed application the tool should provide dbx-like functions that will allow the user to monitor and control the execution of multiple programs with many threads of execution running on various machines. It must also allow the user to display and modify the run-time state of all of those programs in a coherent fashion from a single user interface. The present invention provides such a method for debugging parallel and distributed applications. This invention can be applied to debugging applications running on variety of operating systems including UNIX, OS/2, Windows, and MVS.

Description

Figure 15:
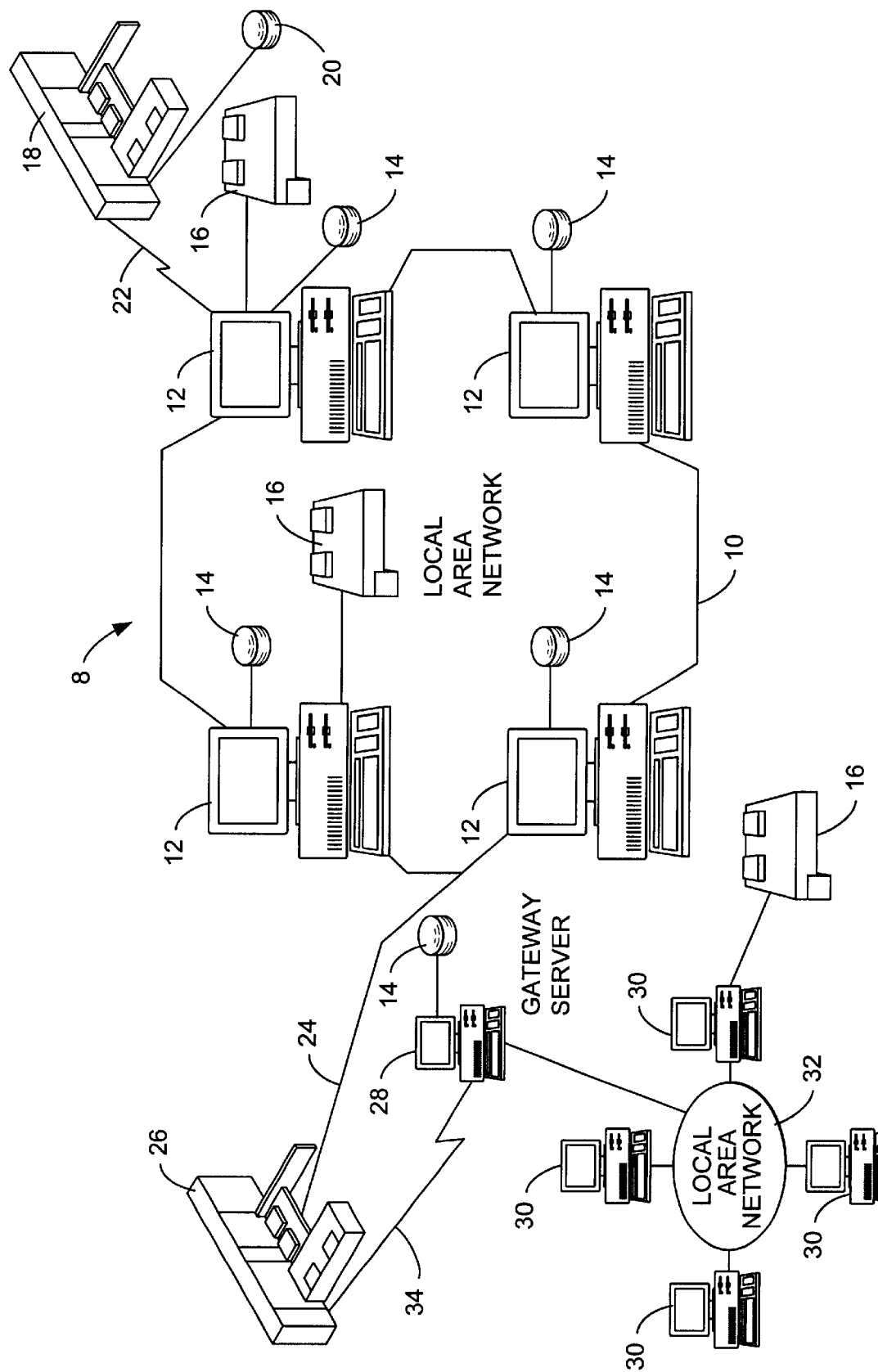
FIG. 15 is a pictorial representation of a distributed data processing system which may be used to implement the method of the present invention.

With reference now to the figures and in particular with reference to FIG. 15, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various computer programs which may be accessed, executed, and debugged by a user within data processing system 8, in accordance with the method of the present invention. In a manner well known in the prior art, each such computer program may be stored within a storage device 14.

Still referring to FIG. 15, it may be seen that data processing system 8 may also include multiple mainframe computers, such as mainframe computer 18, which may be preferably coupled to Local Area Network 10 by means of communication link 22. Mainframe computer 18 may also be coupled to a storage device 20 which may serve as remote storage for Local Area Network 10 which may be coupled via communications controller 26 and communications link 34 to a gateway server 28. Gateway server 28 is preferably an individual computer or Intelligent Work Station which serves to link Local Area Network 32 to Local Area Network 10.

As discussed above with respect to Local Area Network 32 and Local Area Network 10, a plurality of server computer programs may be stored within storage device 20 and executed by mainframe computer 18. Similarly, a plurality of client computer programs may be stored within storage devices 14 and executed by individual computers 12 such that distributed client/server computer programs are provided. Of course, those skilled in the art will appreciate that the mainframe computer 18 may be located a great geographical distance from Local Area Network 10, and similarly, Local Area Network 10 may be located a substantial distance from Local Area Network 32. That is, Local Area Network 32 may be located in California while Local Area Network 10 may be located within Texas and mainframe computer 18 may be located in New York.

As will be appreciated upon reference to the foregoing, it is often desirable for a user within one portion of distributed data processing system 8 to execute computer programs on one or more portions of data processing system 8. For example, the user may execute an client computer program on computer 12 which requests services from a server program executing on mainframe 18 which further requests services from service routines executing on computer 30. To verify the proper operation of such a distributed set of client/server programs, the user may wish to debug the distributed set of client/server programs as if they were one single program. Therefore, it should be obvious that a need exists for a method whereby the user may debug the distributed set of client/server programs as if they were one single program.

Figure 16:
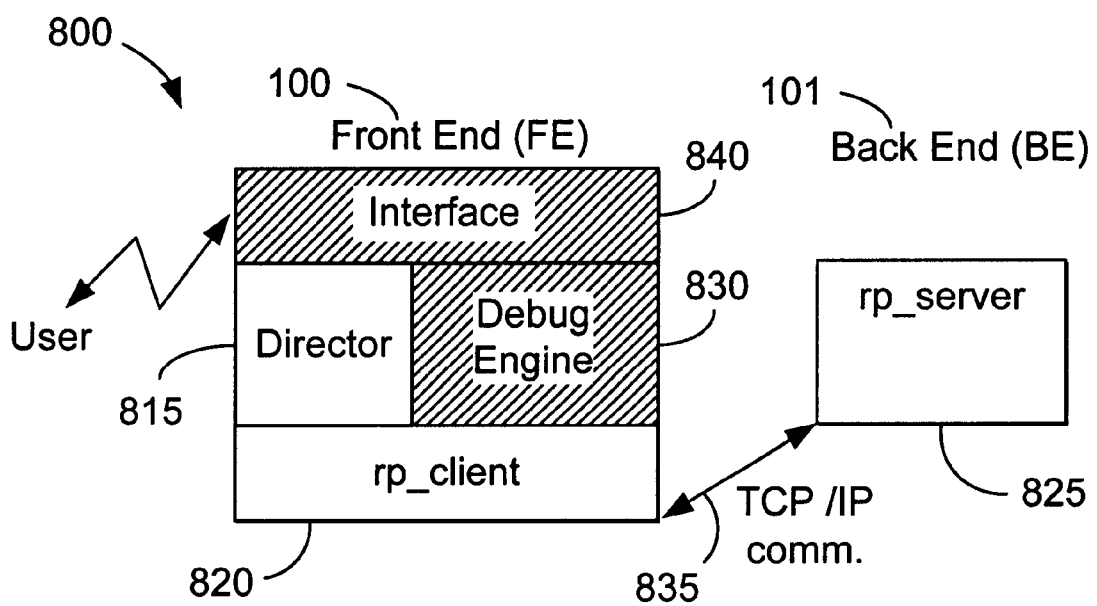
FIG. 16 is pictorial block diagram representation of a debugger component architecture in accordance with the present invention.

Referring now to FIG. 16, the preferred embodiment of the present invention is a debugger 800 which is itself a client/server application. It consists of a front-end 100 and one or more back-ends 101 as illustrated in FIG. 16 and FIG. 9.

This invention creates a Director 815 component which handles most of the initialization and parallel execution control issues and a rp_client 820 and rp_server 825 component which handles most of the distributed execution issues.

The Director 815 allows the Debug Engine 830 to be unaware of most of the parallel and distributed aspects of the application. Thus, the Debug Engine can be created by re-using a serial debugger for presenting the state information about the various programs that make up the application.

Back-End

Referring now to FIG. 9, a back-end (101, 102, and 103) is allocated for each program (111, 112, and 113) (i.e. client or server program) involved in the application. The creation of back-ends (101, 102, and 103) is done by the front-end Director component 815 when the debugger 800 is invoked. Each application program (111, 112, and 113) is monitored by its corresponding back-end (101, 102, and 103) during the debugging process. The back-end (101, 102, and 103) will execute requests from the front-end 100 to control the execution of the application program (111, 112, and 113) and read/write state information.

For the single client/server paradigm, which is a very common case, if the client or server program is on the same machine as the debugger front-end, then the program is directly monitored by the front-end (rp_client component) to avoid the overhead of allocating a back-end. This optimization is especially effective for debugging a non-distributed program that will eliminate the need to allocate a back-end.

In some operating systems, an address-space can create additional address-spaces. For example, a program running in a UNIX process (i.e. address-space) such as P2 112 can create additional processes (such as P21 135, P22 140, and P23 145) during execution by executing fork system call, and then load a new program into that process using the exec system call. The process for the application program 112 and all processes that it has created (135, 140, and 145) can be monitored by a single back-end 102. In addition, the back-end handles interrupt signals from those processes and passes information to the front-end as needed.

The rp_server component (150, 155, and 160) in the back-end (101, 102, and 103 respectively) is responsible for the communication with the rp_client component 820 in the front-end. The message requests that flow from the front-end to the back-end are:

Establish Connection
Establishes the connection between the front-end and the back-end.
Load A Program
Load a program and begin monitoring it.
Get Loader Information
Read information about a program that is currently loaded and being monitored by the back-end.
Read Program State
A request to read the value from a register or location in memory of a program being monitored by the back-end.
Write Program State
A request to write a value to a register or location in memory of a program being monitored by the back-end.
Start Execution
Start the execution of all the programs that are monitored by the back-end.
Wait For Interrupt
Determine if a interrupt (e.g. breakpoint) has occurred in any thread.
Stop Execution
Stop the execution of the programs that are monitored by the back-end.
Read Thread Information
Read information about a particular thread. The information sent back to the front-end includes the thread state (e.g. running, ready, waiting) and status (e.g. breakpoint, interrupted, floating point exception), current instruction pointer, and current frame pointer. This routine can be called iteratively to obtain information about all of the threads running in an address-space.
Unload A Program
Unload a program and stop monitoring it.
Quit
Terminate the back-end and disconnects it from the front-end.

The communication between the front-end and the back-end (835, 165, 170, and 175) can be implemented using any of a variety of standard protocols including TCP/IP, SNA, NETBIOS. The general model of the communication is Remote Procedure Call (RPC)

FIG. 9 illustrates an example of a multiple client/server UNIX application. Programs P1 111 and P3 113 each have one process only, but P2 112 spawns three processes (P21 135, P22 140, and P23 145) during execution. The communication functions of every back-end talks to the same component of the front-end, rp_client using Sun RPC running on a TCP/IP communications protocol.

Front-End

Referring back to FIG. 16, the debugger front-end 100 is composed of the Director 815, Debug Engine 830, Interface 840, and rp_client 820 components. The shadow area in FIG. 8 (i.e., Interface 840 and Debug Engine 830) are both re-used from a serial debugger with some modifications.

Note that it is very common for a serial debugger to be divided into an Interface component and a Debug Engine component. For example, dbx for AIX/6000 supplies a programming interface between its command line processor and debug engine. This allows other debugger front-ends (e.g. xde or the workbench debugger) to re-use the dbx Debug Engine.

Director

The Director 815 allows the Debug Engine 830 and Interface 840 components to be unaware of most of the parallel and distributed aspects. A serial debugger will generally have a set of global variables that are used to record the state of the debugging session. For example, which breakpoints or watchpoints have been set, the location of the symbol table information, the name of the program that is currently loaded etc.. In the present invention, the serial debugger's global variables will become fields of new data structures that are allocated by the Director component.

Figure 17:
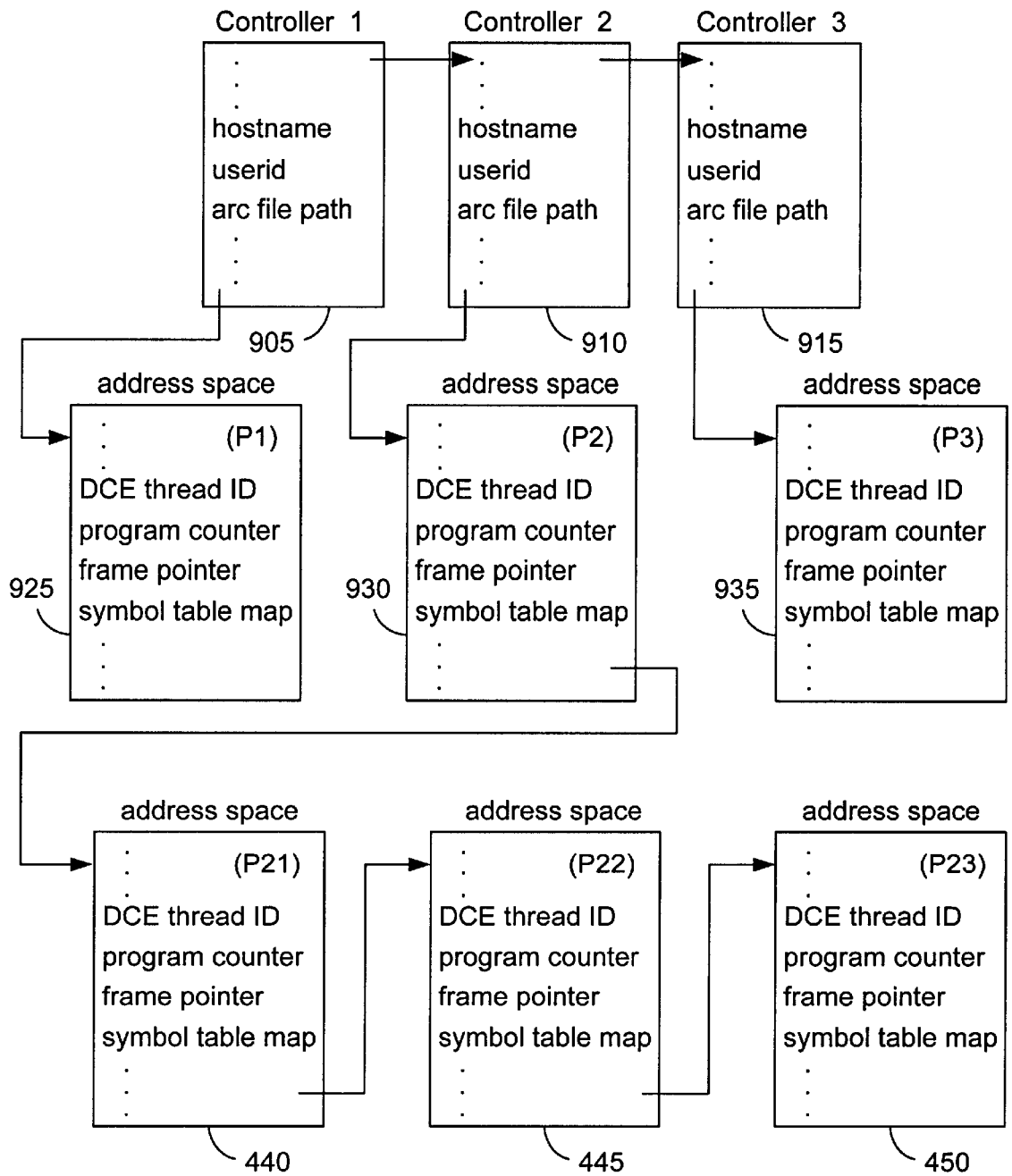
FIG. 17 is pictorial block diagram representation of controller and address-space data structures of a debugger front-end in accordance with the present invention.

Referring now to FIG. 17 for each back-end (101, 102, and 103) created during initialization, the Director 815 allocates a data structure called a controller (905, 910, and 915 respectively). The controller is used to record information such as the absolute path where the source code can be found, the hostname of the machine where the application program is executing, the name of the original program that was loaded etc..

The controller also points to a set of address-space data structures (925, 930, and 935) that keep track of the current execution state for each program (e.g. UNIX process) that is being monitored by the back-end. The execution state includes the name of the program that is currently being executed, the ID of the current thread, the current program counter, a pointer to the current stack frame, and information about the most recent program interrupt. The address-space data structure also contains information such as: the setting of breakpoints and watchpoints, the location of the symbol table information, and the format of variables when they are displayed to the interface.

As an example, when the user requests the Interface component 840 to display a particular thread of an application 111, the Director 815 instructs the rp_client component 820 to send all future communications to the back-end 101 that is monitoring the selected thread 111. The Director 815 then makes assignments to a set of variables that point to the controller 905 and address-space data structures 925 which correspond to the specific machine, address-space, and thread that was selected.

A set of macros are defined to allow the routines in the Debug Engine 830 and Interface 840 components to access and update the serial debugger's global variables by de-referencing the fields in the selected controller and address-space data structures. Also, additional macros are written so that calls to read and write the program state will be handled by routines in the rp_client 820 and rp_server 825 components.

Therefore, the Debug Engine 830 and Interface 840 components can be coded as if they are debugging a single program. This technique minimizes the changes to the original source code from the serial debugger.

In response to a start execution command from the user, the Director 815 will supervise the execution of the parallel and distributed application. It starts the application by sending commands to each back-end (101, 102, and 103) to start or continue executing the programs (111, 112, and 113 respectively) they are monitoring. The Director 815 will then poll the back-ends (101, 102, and 103) for current status until one of the back-ends reports that a program it is monitoring has encountered a breakpoint, watchpoint, program interrupt, or termination. At that moment, the Director 815 will send a stop command to all other back-ends which in turn send an interrupt program execution signal (e.g., SICINIT in UNIX) to each of the programs they are monitoring. Meanwhile, the Director 815 tells the Interface 840 and Debug Engine 830 components which thread caused the application to stop. The Interface 840 is then called to allow the user to display and modify the frozen state of that thread. As a result, the Interface 840 will call the Debug Engine 830 to read and write the thread state.

Debug Engine

The Debug Engine component 830 is derived from an existing serial debugger which supports conventional serial debugging commands (e.g., symbol table resolution, setting breakpoints, step execution, etc.). It uses the set of macros mentioned above to allow the routines in the Debug Engine 830 to access and update the controller (905, 910, and 915) and address-space data structures (925, 930, and 935 respectively) that record the state of the debugging session and to read and write the program state. This component can be coded as if it is debugging a non-distributed serial program.

Interface

The Interface component 840 is also derived from the serial debugger. It uses the same set of macros defined above to access and update the controller (905, 910, and 915) and address-space data structures (925, 930, and 935 respectively) and to read and write the program state. This again minimizes changes to the original source code from the serial debugger.

This component needs to be modified so that it commands to start and stop the execution of the parallel and distributed application are sent to the Director component 815 rather than directly to the Debug Engine 830.

In addition, modifications are needed to list and select the various machines, address-spaces, and threads of the parallel and distributed application.

For example, if the debugger 800 has a window based interface 840 a new window could be added to list all of the machines, address-spaces, and threads involved in the application in an indented list:

```
machine1
    address-space1
        thread1
        thread2
        thread3
    address-space2
        thread1
        thread2
machine2
    address-space1
        thread1
        thread2
        thread3
    address-space2
        thread1
        thread2
        thread3
```

When the application is stopped the user can select any of the threads in that window by clicking on it. A call is made to a routine in the Director component 815 to set the current machine, address-space, and thread. Routines in the Interface component 840 are then called to re-draw the state of the selected machine, address-space, and thread.

In the case of a command driven non-window interface, two new commands need to be added: one to list the various machines, address-spaces, and threads; and a second one to set the current machine, address-space, and thread.

rp_client

The rp_client component 820 contains an Application Programming Interface (API) for a set of routines that are used to communicate with the various back-ends (101, 102, and 103). There is one routine for every type of message request that flows between the front-end 205 and back-end (101, 102, and 103). Also, there is a routine which is called by the Director 815 to specify which back-end to communicate with. The rp_client 820 marshalls the argument passed by the API call into a message and sends it to the back-end (101, 102, and 103) using a synchronous protocol (e.g. RPC) (835, 165, 170, and 175). Eventually, the rp_client 820 component will receive a response message from the back-end (101, 102, and 103) which contains return arguments. These arguments are unmarshalled from the message and passed back to the caller of the API routine. The rp_client component 820 communicates with only one back-end at a time that is specified by the Director 815.

Control Flows of Director Initialization

The Director component 815 is invoked during the initialization of the debugger 800 to start the application running under the debugger 800. The application may be made up of multiple programs with many threads of execution running on various machines. The user needs to specify the various programs that make up the application. For each program the user needs to specify the program arguments, the host machine the program should run on, and the user ID the program should run under. In addition, the role the program plays with respect to client/server and peer-to-peer communication may be specified. The valid roles are client, server, both, peer-to-peer, or none. The Director component 815, for example, may use the role information to determine the order in which the programs need to be started (e.g., servers must start before clients). Optionally, additional information may be specified for passwords, debugging options, etc.. For example, the debugger 800 may allow the user to specify this information in a file such as in the following example:

| | | | | | |
|---|---|---|---|---|---|
| -H davinci | -U hpan | -P secrets | -R client | calc_client | 264167 |
| -H davinci | -U hpan | -P secrets | -R client | calc_client | 545555 |
| -H atlantic | -U meier | -P dontlook | -R server | calc_servera | |
| -H thistle | -U hpan | -P hideit | -R both | calc_serverb | |

This example file shows a distributed application made up of four programs running on three different machines under three different user ID's. The first line specifies a program named calc_client should be started on a machine named davinci under the user ID of hpan with password secrets. The program will play the role of a client and is passed one argument which is 264167. The second line starts a second instance of the client program calc_client on the same machine and user ID. In this case, the program argument is 545555. The third line specifies that a program named calc_servera should be started on a machine named atlantic under the user ID of meier with password dontlook. This program will play the role of a server. And finally, the fourth line specifies that a program named calc_serverb should be started on a machine named thistle under the user ID of hpan with password hideit. This program is both a client program and a server program.

The following procedure is executed once for each of the programs that make up the application. During initialization, the debugger 800 will call the Director component 815 passing the name of the file that specifies the various programs for the application. The director component 815 will open the above file and for each program specified will do the following:

1. Read in the name of the program, arguments, host machine etc..
2. Allocate and initialize a controller data structure.
3. Start a debugger back-end on the host machine that the program should run on using the remote execution command (rexec).
4. Allocate and initialize an address-space data structure.
5. Send a Establish Connection message request to the debugger back-end.
6. Send a Load A Program message request to the back-end to load the application program.
7. Send a Get Loader Information message request to the back-end to update the address-space data structure with information about what programs and library routines were loaded as a result of the Load A Program message request.
8. Send a Get Symbol Table message request to the back-end to update the address-space data structure with the symbol tables for the programs and library routines.
9. Call the Debug Engine to perform standard initialization routines (e.g., run the program to the first executable source line).

Running the Application Program

In response to one of the start execution commands from the user, the Interface component 840 will call the Director component 815 to supervise the execution of the parallel and distributed application. The Director component 815 starts the application by sending commands to each back-end (101, 102, and 103) to start or continue executing the programs they are monitoring.

In many client/server applications, it is necessary for the server programs to be running before the clients can be started. By specifying the roles of client, server, or both for the programs, the Director 815 may ensure that the client programs are not started until all of the programs that are servers or both are ready to receive client requests. In the general case, the user can add a call to a library routine named dbgServerReady at the point in the server program where it is ready to receive client messages. The C language syntax for this library routine is: dbgServerReady( );.

This dbgServerReady routine notifies the Director component 815 of the debugger 800 that the server is ready to receive client requests by, for example, sending a signal or executing a breakpoint. If the server is not running under the debugger 800, dbgServerReady will simply return. To improve ease of use, the communication middle-ware may automatically execute the call to dbgServerReady. For example, for RPC it may be executed at the beginning of the RPC "server listen" routine.

After the application is started, the Director 815 will poll the back-ends (101, 102, and 103) for current status until one of the back-ends reports that a program it is monitoring has encountered a breakpoint, watchpoint, program interrupt, or termination. The Director 815 will then send a Stop Execution message request to all other back-ends, which in turn will send an "interrupt program execution" signal (e.g., SIGINIT in UNIX) to each of the programs they are monitoring.

The following are the steps preferred in carrying out the method of, and system for, the Director 815 when it is called by the Interface component 840 in response to a command from the user to start or continue the execution of a distributed application. These steps are sufficient to enable one of ordinary skill to write code in any suitable computer programming language.

1. Start or continue the execution of the application by looping thru all of the controllers and, for each one, doing the following:
    a. If the role of the program associated with the controller is client, check to see that all of the programs that have a role of server or both have executed the dbgServerReady library routine and are therefore ready to receive client requests. If not skip to the next controller.
    b. For all address-space structures pointed to by this controller execute the conventional debugger routine that will start the program executing.
2. Execute polling loop.
    a. Get the first controller from the list of controllers created at debugger initialization.
    b. Send a Check For Interrupt message request to the back-end. If an interrupt has occurred, exit the polling loop by going to step 3.
    c. If not at the end of the list of controllers, get the next controller and go to step 2.b.
    d. Call a user interface routine to determine if the user has executed a Stop command. If yes, exit the polling loop by going to step 3.
    e. Wait for one second to limit the contention of network resources (e.g. execute a sleep(1) UNIX system call).
    f. Go back to the beginning of the polling loop at step 2.a.
3. Stop the execution of the application by looping thru all of the controllers and sending a Stop Execution message request to any controller that has at least one thread still running.
4. Update the controller and address-space data structures by looping thru all of the controllers again and, for each one, doing the following:

a. Get the first address-space ID running under the back-end by sending a Get Next Address Space ID message request with a address-space ID of 0.
b. If no more address-space IDs are found, continue to next controller.
c. Search the list of address-space data structures pointed to by the controller data structure to determine if this is a new address space (e.g., created by fork system call on UNIX). If this is a new address-space:
   Allocate and initialize an address-space data structure.
   Send a Get Loader Information message request to the back-end to update the address-space data structure with information about what programs and library routines were loaded.
   Send a Get Symbol Table message request to the back-end to update the new address-space data structure with the symbol tables for the programs and library routines.
d. Send a Get Address Space Information message request to the back-end and update the address-space data structure.
e. Send a Get Thread Information message request to the back-end for the current thread ID and update the address-space data structure.
f. If the information about that last program interrupt in the address-space indicates that a dynamic load has occurred do the following:
   Send a Get Loader Information message request to the back-end to update the address-space data structure with information about what programs and library routines were loaded.
   Send a Get Symbol Table message request to the back-end to update the new address-space data structure with the symbol tables for the programs and library routines.
g. If the information about that last program interrupt in the address-space indicates the program has executed a call to the dbgServerReady library routine, set a flag in the address-space data structure to indicate that this server is ready to receive client requests.
h. Check to see if there are any more address-spaces running under the back-end by sending a Get Next Address Space ID message request and go to step 4.b.
5. After all the controller and address-space data structures have been updated, return to the User Interface component which will display the current state of the application to the user and process commands.

The above describes a debugger client/server application comprising a front-end and one or more back-ends, including a Director component which handles most of the initialization and parallel execution control issues and a rp_client component and rp_server component which handles most of the distributed execution issues. The Director allows a Debug Engine to be unaware of most of the parallel and distributed aspects of the application. Thus, the Debug Engine can be created by re-using a serial debugger for presenting the state information about the various programs that make up the application.

More specifically, the above describes a system for debugging a distributed computer program comprising: a Front End means comprising: a Director means for allocating a controller data structure for storing an execution state of the distributed computer program; a Debug Engine means derived from a serial debugger supporting conventional serial debugging commands and having global variables for storing a state of a debug session; and means for accessing the controller data structure to update the global variables; and a Back End means for executing requests from the Front End means to control execution of the distributed computer program.

Also, the above describes a method of debugging a distributed computer program, comprising the steps of: allocating a controller data structure by a Front End for storing an execution state of the distributed computer program; storing a state of a debug session in global variables of a Debug Engine derived from a serial debugger supporting conventional serial debugging commands; accessing the controller data structure to update the global variables; and executing requests by a Back End from the Front End to control execution of the distributed computer program.

In addition, the above describes a computer program for debugging a distributed computer program, comprising: a Front End program means comprising: a Director program means for allocating a controller data structure for storing an execution state of the distributed computer program; a Debug Engine program means derived from a serial debugger supporting conventional serial debugging commands and having global variables for storing a state of a debug session; and program means for accessing the controller data structure to update the global variables; and a Back End program means for executing requests from the Front End program means to control execution of the distributed computer program.

All of the above described data structures, definitions, routines, and interfaces bear the following copyright notice: Copyright IBM Corporation 1995.

Using the foregoing specifications, the invention may be implemented using standard programming techniques. The resulting programs may be stored on disk, diskettes, memory cards, ROM or any other memory device for use in a computer. For execution, the program may be copied into the RAM of the computer. One skilled in the art of computer science will easily be able to combine the software created as described with appropriate general purpose or special purpose computer hardware to create a system for executing the programs. While the preferred embodiment of the present invention has been illustrated in detail, it should be apparent that modifications and adaptations to that embodiment may occur to one skilled in the art without departing from the scope of the present invention as set forth in the following claims.

We claim:

1. A method for debugging an external program, said method comprising:
   initiating a debugger to debug an external program stored on a server, wherein the debugger is initiated from within a process running the external program by executing a special segment of code with the execution of the external program; and
   creating a debugger process for the initiated debugger, wherein execution breaks at a first executable statement of the external program being debugged.

2. A method for debugging an external program, said method comprising:
   initiating a debugger to debug an external program stored on a server from within a process running the DBMS external program to be debugged by executing a special segment of code with the execution of the external program; and
   creating a debugger process wherein execution will break at a specified executable statement of the external program being debugged.

3. A method for debugging an external program, said method comprising:

initiating a debugger process to debug an external program stored on a server from within a process running the DBMS external program to be debugged by executing a special segment of code with the execution of the external program; and creating the debugger process to execute the external program being debugged.

4. A system for debugging an external program, said system comprising:

means for initiating a debugger to debug an external program stored on a server from within a process running the external program to be debugged by executing a special segment of code with the execution of the external program; and means for creating a debugger process wherein execution will break at a specified executable statement of the external program being debugged.

5. A system for debugging an external program, said system comprising:

means for initiating a debugger process to debug an external program stored on a server from within a process running the external program to be debugged by executing a special segment of code with the execution of the external program; and means for creating the debugger process to execute the external program being debugged.

6. The system of claim 4 wherein the external program is a user-defined function and the external program process is a UDF process.

7. The system of claim 4 wherein the external program is a stored procedure and the external program process is a stored procedure process.

8. The system of claim 4 wherein the means for initiating the debugger from within the external program process is performed by a database management system.

9. The system of claim 8 wherein the database management system comprises means for preparing a shell command for invoking a debugger; means for spawning a new process for running the shell command as a background job while returning to a calling process; and means for keeping the new process idle for a period of time to allow attachment of the debugger before the calling process executes the external program.

10. The system of claim 9 wherein the means for preparing a shell command further comprises means for identifying the external program process being debugged; means for specifying where a source file of the external program is located; means for informing the debugger to break at a specified function; means for specifying a name of the external program to be debugged; and means for redirecting a display output and mapping input devices to an address of a machine of a user interested in debug information if the machine is remote from the debugger.

11. The system of claim 5 wherein the special segment of code comprises means for preparing a shell command for invoking a debugger; means for spawning a new process for running the shell command as a background job while returning to a calling process; and means for keeping the new process idle for a period of time to allow attachment of the debugger before the calling process executes the external program.

12. The system of claim 11 wherein the means for preparing a shell command further comprises means for identifying the external program process being debugged; means for specifying where a source file of the external program is located; means for specifying a name of the external program to be debugged; and means for redirecting a display output and mapping input devices to an address of a machine of a user interested in debug information if the machine is remote from the debugger.

13. The system of claim 5 wherein the special segment of code comprises a macro DEBUG_UDF for specifying debugging information.

14. The system of claim 5 wherein the special segment of code further comprises means for registering a current debugging session with a database management system; and means for bringing up the debugger if a current process is not being traced and no attempt was made previously to bring up the debugger.

15. The system of claim 5 wherein the special segment of code further comprises means for registering a current debugging session with a database management system; means for returning a token uniquely identifying the current debugging session if a name of the current debugging session is not an existing registered debugging session; and means for returning a token identifying a previously registered debugging session if the name of the current debugging session is previously registered.

16. The system of claim 14 wherein the means for registering the current debugging session is contained in a programming line DEBUG_UDF which specifies the debugger, a source directory of the external function, a client machine, and a name of the external function.

17. The system of claim 5 wherein the external program specifies the debugger, a source directory of the external program, a client machine, and a name of the external program.

18. The system of claim 16 further comprising means for invoking the external function; an means for bringing up the debugger and breaking at the DEBUG_UDF programming line.

19. The system of claim 18 further comprising means for displaying a debugger window on the client machine.

* * * * *

UNITED STATES PATENT AND TRADEMARK OFFICE
CERTIFICATE OF CORRECTION

PATENT NO. : 6,324,683 B1
DATED : November 21, 2001
INVENTOR(S) : You-Chin Gene Fuh, Michael Stephen Meier and Hsin Pan It is certified that error appears in the above-identified patent and that said Letters Patent is hereby corrected as shown below:

Column 62,
Lines 41 and 42, "function" should read -- program --; and
Line 48, "function" should read -- program --.

Signed and Sealed this

Twentieth Day of May, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,324,683 B1 Page 1 of 1
DATED : November 27, 2001
INVENTOR(S) : You-Chin Gene Fuh, Michael Stephen Meier and Hsin Pan It is certified that error appears in the above-identified patent and that said Letters Patent is hereby corrected as shown below:

<u>Column 62,</u>
Lines 41 and 42, "function" should read -- program --; and
Line 48, "function" should read -- program --.

This certificate supersedes Certificate of Correction issued May 20, 2003.

Signed and Sealed this

Fifteenth Day of November, 2005

JON W. DUDAS
*Director of the United States Patent and Trademark Office*